United States Patent
Haddleton et al.

(12) 
(10) Patent No.: US 6,664,350 B1
(45) Date of Patent: Dec. 16, 2003

(54) SUPPORTED POLYMERISATION CATALYST

(75) Inventors: David M. Haddleton, Kenilworth (GB); Arnaud Radigue, Coventry (GB); Dax Kukulj, Chester (GB); David Duncalf, Coventry (GB)

(73) Assignee: University of Warwick, Coventry (GB)

( * ) Notice: Subject to any disclaimer, the term of this patent is extended or adjusted under 35 U.S.C. 154(b) by 0 days.

(21) Appl. No.: 09/555,145

(22) PCT Filed: Dec. 2, 1998

(86) PCT No.: PCT/GB98/03592

§ 371 (c)(1),
(2), (4) Date: Aug. 14, 2000

(87) PCT Pub. No.: WO99/28352

PCT Pub. Date: Jun. 10, 1999

(30) Foreign Application Priority Data

Dec. 2, 1997 (GB) .............................................. 9725455

(51) Int. Cl.$^7$ .............................. C08F 4/02; C08F 4/44; C08F 4/70

(52) U.S. Cl. ...................... 526/135; 526/126; 526/130; 526/145; 526/146; 526/147; 526/171; 526/172; 526/904; 526/161; 526/169.1; 502/158; 502/159; 502/162; 502/165; 502/166; 502/167; 502/155; 502/152; 502/229

(58) Field of Search ............................. 502/150, 158, 502/159, 162, 165, 166, 167, 152, 155, 229; 526/126, 130, 145, 146, 147, 171, 172, 904, 135, 161, 169.1

(56) References Cited

U.S. PATENT DOCUMENTS 5,807,937 A    9/1998 Matyjaszewski et al.
6,030,917 A  * 2/2000 Weinberg et al. ........... 502/104

FOREIGN PATENT DOCUMENTS

EP    0-558-143 A1    2/1993
WO    WO-96-30421    10/1996
WO    WO-97/47661 A  12/1997
WO    WO-98-03521 A   1/1998

OTHER PUBLICATIONS

Chang, Chemistry, McGraw–Hill, 1988, pg. 497.*
Kato et al., Macromolecules, 1995, 28, 1721–1723.
Percec et al., Macromolecules 1995, 28, 7970–7972.
Haddleton et al., Macromlecules, 1997, 30, 3992–3998.
Nishikawa et al., Macromolecules, 1997, 30, 2244.
Wang et al., Macromolecules, 1995, 28, 7901–7910.
Uozumi et al., Tet. Lett., 1997, 38, 3557–3560.
Pachenko et al., Polymer Science Series A., 1995, 37, 1445–1451.

* cited by examiner

*Primary Examiner*—David W. Wu
*Assistant Examiner*—R. Rabago
(74) *Attorney, Agent, or Firm*—Oliff & Berridge, PLC

(57) ABSTRACT

The invention relates to supported ligands and catalysts for use in the polymerization of olefinically unsaturated monomers such as vinylic monomers, comprising the use of a compound attached to support, the compound being capable of complexing with a transitional metal. Preferably the compound capable of complexing with a transition metal is a diimine such as a 1,4-diaza-1,3-butadiene, a 2-pyridinecarbaldehyde imine, an oxazolidone or a quinoline carbaldeyde. Preferably the catalysts are used in conjunction with an initiator comprising a homolytically cleavable bond with a halogen atom. The application also discloses processes for attaching ligands to supports, and processes for using the catalysts disclosed in the application.

22 Claims, 5 Drawing Sheets

SUPPORTED POLYMERISATION CATALYST

BACKGROUND OF THE INVENTION

1. Field of Invention

The present invention relates to immobilised supported polymerisation catalysts for atom transfer polymerisation of olefinically unsaturated monomers in which molecular weight control is achieved by the presence of certain transition metal, especially copper, complexes.

2. Description of Related Art

It is desirable to be able to produce high molecular weight polymers with a low molecular weight distribution by catalysed addition polymerisation, in particular of vinylic monomers. Hitherto this has been achieved by polymerising via ionic processes typically in the presence of organometallics such as alkyl lithiums which are sensitive as regards reaction with water and other protic species. As such, monomers containing functional groups are not readily polymerised. The use of ionic systems also precludes the use of solvents which contain protic groups and/or impurities resulting in very stringent reaction conditions and reagent purity being employed.

More recently atom transfer polymerisation based on the combination of a transition metal halide and alkyl halide have been utilised. For example, Matyjasewski (Macromolecules (1995), vol. 28, pages 7901–7910 and WO96/30421) has described the use of CuX (where X=Cl, Br) in conjunction with bipyridine and an alkyl halide to give polymers of narrow molecular weight distribution and controlled molecular weight. This system suffers from the disadvantage that the copper catalyst is partially soluble in the system and thus a mixture of homogeneous and heterogeneous polymerisation ensues. The level of catalyst which is active in solution is thus difficult to determine. The catalyst residues which are soluble in the reaction medium prove difficult to remove from the product. Percec (Macromolecules, (1995), vol. 28, page 1995) has extended Matyjasewski's work by utilising arenesulphonyl chlorides to replace alkyl chlorides, again this results in a mixture of homogeneous and heterogeneous polymerisation and catalyst residues are difficult to remove from the product. Sawamoto (Macromolecules, (1995), vol. 28, page 1721 and Macromolecules, (1997), vol. 30, page 2244) has also utilised a ruthenium based system for similar polymerisation of methacrylates. This system requires activation of monomer by an aluminum alkyl in order to achieve the best results, itself sensitive to reaction with protic species which is an inherent disadvantage. These systems have been described as proceeding via a free radical mechanism which suffers from the problem that the rate of termination is >0 due to normal radical-radical combination and disproportionation reactions.

The inventors have found that the use of diimines such as 1,4-diaza-1,3-butadienes and 2-pyridinecarbaldehyde imines may be used in place of bipyridines. These ligands offer the advantage of homogeneous polymerisation and thus the level of active catalyst can be accurately controlled and only one polymerisation process ensues. This class of ligand also enables the control of the relative stability of the transition metal valencies, for example, Cu(I) and Cu(II), by altering ancillary substituents and thus gives control over the nature of the products through control over the appropriate chemical equilibrium. Such a system is tolerant to trace impurities, trace levels of $O_2$ and functional monomers, and may even be conducted in aqueous media. This system is the subject of copending patent application number PCT/GB97/01587.

A further advantage of this system is that the presence of free-radical inhibitors traditionally used to inhibit polymerisation of commercial monomers in storage, such as 2,6-di-tert-butyl-4-methylphenol (topanol), increases the rate of reaction of the invention. This means that lengthy purification of commercial monomers to remove such radical inhibitors is not required. Furthermore, this indicates that the system is not a free-radical process. This is contrary to Matajaszewski and Sawamoto who show free-radical based systems.

A difficulty identified by the inventors for the commercialisation of the radical polymerisation system of Matajazewski and Sawamoto, and the diimine-based system described above is that high levels of catalysts are required for acceptable rates of polymerisation. This means that catalyst is relatively expensive as it is not recycled/reused and it must be removed by lengthy procedures to prevent contamination of the final product and to keep production costs down.

SUMMARY OF THE INVENTION

The inventors have therefore identified a process for attaching the catalyst to supports which allows the catalyst to be easily recovered and produces products with substantially less contamination than previously described systems.

Such supported catalysts were expected by the inventors to clump together since each metal ion can coordinate with two-ligands, each of which is attached to a support. This would reduce the effectiveness of such supported systems. However, this has not been observed by the inventors. Furthermore, the metal ion is tightly bound to the ligands and does not leach off into the surrounding solution or product, allowing it to be reused.

A first aspect of the invention provides a supported ligand for use in catalysts for polymerisation of olefinically unsaturated monomers, especially vinylic monomers, said ligand being one or more compounds attached to a support.

Such a ligand has general formula:

$$S(D)_n \qquad \text{FORMULA 1}$$

where:
  S is the support,
  D is a compound attached to the support, said compound being capable of complexing with a transition metal, and
  n is an integer of one or more.

Preferably, the support is inorganic, such as silica, especially silica gel. Alternatively the support may be organic, especially an organic polymer, especially a cross-linked organic polymer, such as poly(styrene-w-divinylbenzone). Preferably the support is in the form of beads. This latter form is particularly advantageous because it has a high surface area which allows the attachment of a large number of compounds, whilst presenting a large surface area to the medium to be catalysed.

The compound (D) may be adsorbed onto the support or covalently attached to the support.

Preferably the compound is an organic compound comprising Schiff base, amine, hydroxyl, phosphine or diimine capable of complexing with a transition metal ion. Each Schiff base, amine, hydroxyl, phosphine or diimine is preferably separated from the support by a branched or straight alkyl chain, especially a chain containing 1 to 20 carbon atoms. The chain may comprise one or more aromatic groups as part of the alkyl chain.

One preferred ligand is the use of a support attached to two or more alkyl-amines, such as aminopropyl-, aminobutyl-, aminopentyl-, aminohexyl-, aminoheptyl- or aminooctyl-functionalised support. The amine groups are capable of forming a complex with one or more transition metal ions.

Especially preferred compounds are diimines.

Preferably one of the nitrogens of the diimine is not part of an aromatic ring.

Preferably the diimine is a 1,4-diaza-1,3-butadiene

Formula 2

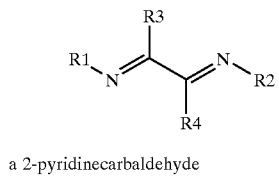

a 2-pyridinecarbaldehyde

Formula 3

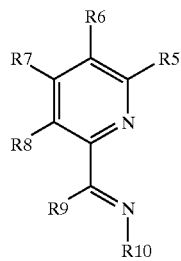

an Oxazolidone

Formula 4

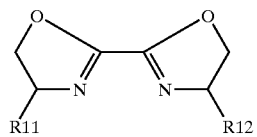

or a Quinoline Carbaldehyde

Formula 5

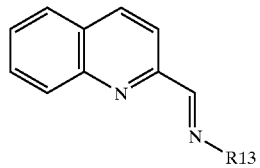

where $R_1$, $R_2$, $R_{10}$, $R_{11}$, $R_{12}$ and $R_{13}$ may be varied independently and $R_1$, $R_2$, $R_{10}$, $R_{11}$, $R_{12}$ and $R_{13}$ may be H, straight chain, branched chain or cyclic saturated alkyl, hydroxyalkyl, carboxyalkyl, aryl (such as phenyl or phenyl substituted where substitution is as described for $R_4$ to $R_9$), $CH_2Ar$ (where Ar=aryl or substituted aryl) or a halogen. Preferably $R_1$, $R_2$, $R_{10}$, $R_{11}$, $R_{12}$ and $R_{13}$ may be a $C_1$ to $C_{20}$ alkyl, hydroxyalkyl or carboxyalkyl, in particular $C_1$ to $C_4$ alkyl, especially methyl or ethyl, n-propylisopropyl, n-butyl, sec-butyl, tent-butyl, cyclohexyl, 2-ethylhexyl, octyl, decyl or lauryl. $R_1$, $R_2$, $R_{10}$, $R_{11}$, $R_{12}$ and $R_{13}$ may especially be methyl.

$R_3$ to $R_9$ may independently be selected from the group described for $R_1$, $R_2$, $R_{10}$, $R_{11}$, $R_{12}$ and $R_{13}$ or additionally $OC_nH_{2n+1}$, (where n is an integer from 1 to 20), $NO_2$, CN or O=CR (where R=alkyl, benzyl $PhCH_2$ or a substituted benzyl, preferably a $C_1$ to $C_{20}$ alkyl, especially a $C_1$ to $C_4$ alkyl).

Furthermore, the compounds may exhibit a chiral centre α to one of the nitrogen groups. This allows the possibility for polymers having different stereochemistry structures to be produced.

Compounds of general Formula 3 may comprise one or more fused rings on the pyridine group.

One or more adjacent $R_1$ and $R_3$, $R_3$ and $R_4$, $R_4$ and $R_2$, $R_{10}$ and $R_9$, $R_8$ and $R_9$, $R_8$ and $R_7$, $R_7$ and $R_6$, $R_6$ and $R_5$ groups may be $C_5$ to $C_8$ cycloalkyl, cycloalkenyl, polycycloalkyl, polycycloalkenyl or cyclicaryl, such as cyclohexyl, cyclohexenyl or norborneyl.

The diimine compounds are preferably covalently attached to the support via positions R1, R2, R9, R10, R11, R12 or R13. They maybe attached via a linkage group, such as a Schiff base to the support.

Preferred diimines include:

Formula 6

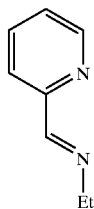

Formula 7

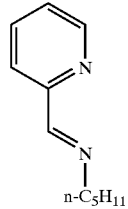

Formula 8

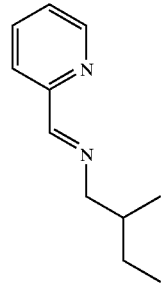

Formula 9

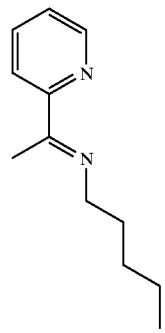

Formula 10

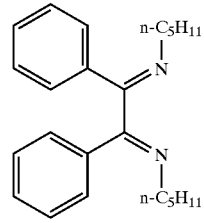

-continued
Formula 11
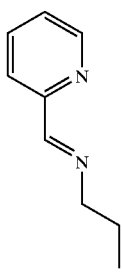
Formula 12
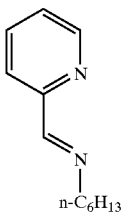
Formula 13
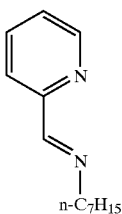
Formula 14
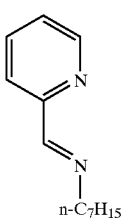
Formula 15
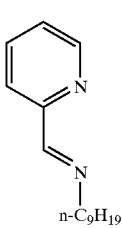
Formula 16
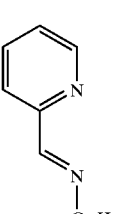
Formula 17
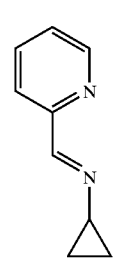
-continued
Formula 18
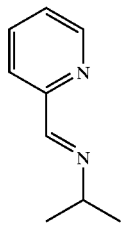
Formula 19
(R) 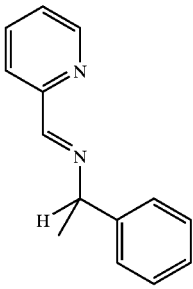
Formula 20
(S) 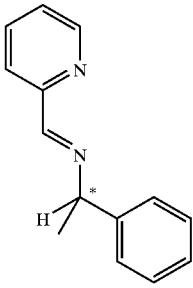
Formula 21
(R'S) 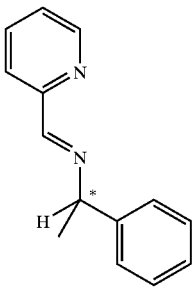
Formula 22
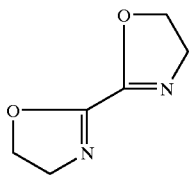
Formula 23
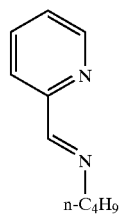

-continued

Formula 24
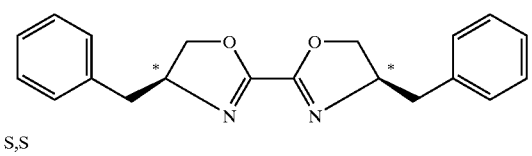
S,S

Formula 25
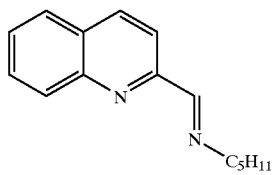

Formula 26
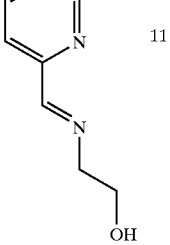

Formula 27
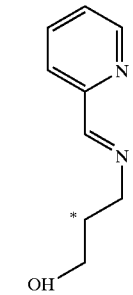

Formula 28
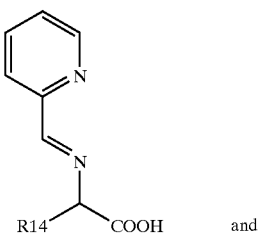
and

Formula 29
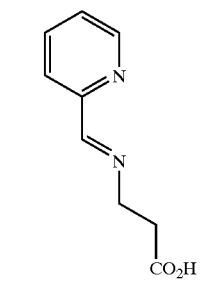

where: * indicates a chiral centre.

R14=Hydrogen, $C_1$ to $C_{10}$ branched chain alkyl, carboxy- or hydroxy-$C_1$ to $C_{10}$ alkyl.

The ligands, according to the first aspect of the invention, may be used to from a catalyst for the addition polymerization of olefinically unsaturated monomers by using them in conjunction with:

a) a compound of formula 30

MY where M is a transition metal in a low valency state or a transition metal in a low valency state co-ordinated to at least one co-ordinating non-charged ligand and Y is a monovalent or polyvalent counterion; and b) an initiator compound comprising a homolytically cleavable bond with a halogen atom.

Homolytically cleavable means a bond which breaks without integral charge formation on either atom by homolytic fission. Conventionally this produces a radical on the compound and a halogen atom radical. For example:

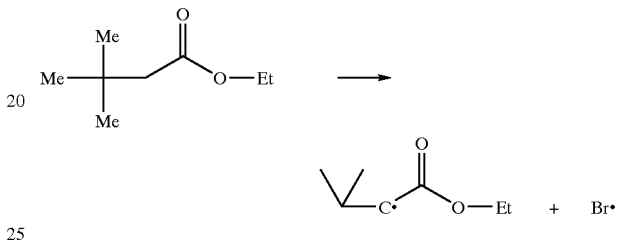

However, the increase in the rate of reaction observed by the inventors with free-radical inhibitor indicates that true free-radicals are not necessarily formed using the catalysts of the invention. It is believed that this possibly occurs in a concerted fashion whereby the monomer is inserted into the bond without formation of a discrete free radical species in the system. That is during propagation this results in the formation at a new carbon-carbon bond and a new carbon-halogen bond without free-radical formation. The mechanism possibly involves bridging halogen atoms such as:

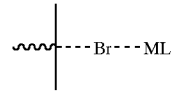

where:

ML is a transition metal-diimine complex.

A "free-radical" is defined as an atom or group of atoms having an unpaired valence electron and which is a separate entity without other interactions.

Transition metals may have different valencies, for example Fe(II) and Fe(III), Cu(I) and Cu(II), a low valency state is the lower of the commonly occurring valencies, i.e. Fe(II) or Cu(I). Hence M in Formula 30 is preferably Cu(I), Fe(II), Co(II), Ru(II), Rh(I) or Ni(II), most preferably Cu(I). Preferably the coordinating ligand is $(CH_3CN)_4$. Y may be chosen from Cl, Br, F, I, $NO_3$, $PF_6$, $BF_4$, $SO_4$, CN, SPh, SCN, SePh or triflate $(CF_3SO_3)$. Copper (I) triflate may be, which may be in the form of a commercially available benzene complex $(CF_3SO_3Cu)_2C_6H_6$. The especially preferred compound used is CuBr.

Preferably the second component (b) is selected from:

Formula 31

Formula 32
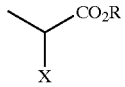

-continued

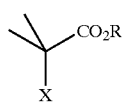
Formula 33

Formula 34

Formula 35

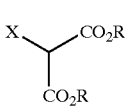
Formula 36

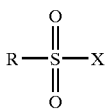
Formula 37

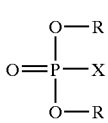
Formula 38

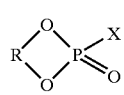
Formula 39

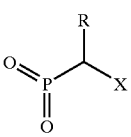
Formula 40

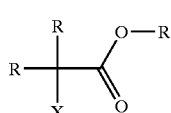
Formula 41 where R is independently selectable and is selected from straight, branched or cyclic alkyl, hydrogen, substituted alkyl, hydroxyalkyl, carboxyalkyl or substituted benzyl. Preferably the or each alkyl, hydroxyalkyl or carboxyalkyl contains 1 to 20, especially 1 to 5 carbon atoms.

X is a halide, especially I, Br, F or Cl.

The second component (b) may especially be selected from Formulae 43 to 52:

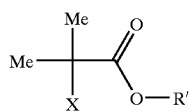
Formula 42 where:
X=Br, I or Cl, preferably Br
R'=—H,
—(CH$_2$)$_p$R" (where m is a whole number, preferably p=1 to 20, more preferably 1 to 10, most preferably 1 to 5, R"=H, OH, COOH, halide, NH$_2$, SO$_3$, COX— where X is Br, I or C) or:

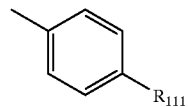
Formula 43

R$_{111}$=—COOH, —COX (where X is Br, I, F or Cl), —OH, —NH$_2$ or —SO$_3$H, especially 2-hydroxyethyl-2'-methyl-2'-bromopropionate.

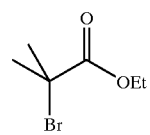
Formula 44

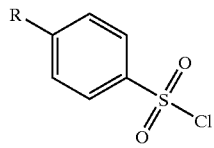
Formula 45

Especially preferred examples of Formula 45 are:

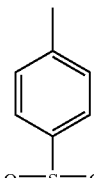
Formula 46A

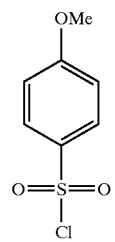
Formula 46B

Br may be used instead at Cl in Formulae 46A and 46B.

Formula 47

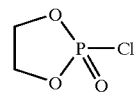
Formula 48F

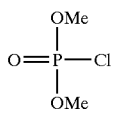
Formula 49

-continued

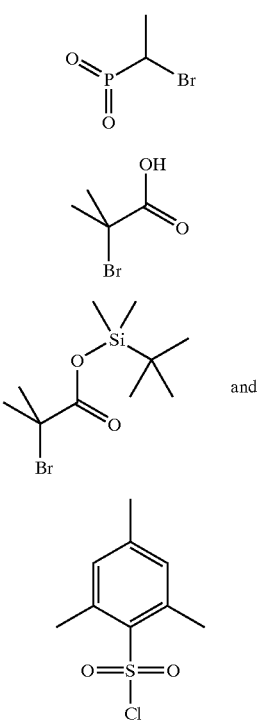

Formula 50

Formula 51 and

Formula 52

Formula 53

The careful selection of functional alkyl halides allows the production of terminally functionalised polymers. For example, the selection of a hydroxy containing alkyl bromide allows the production of α-hydroxy terminal polymers. This can be achieved without the need of protecting group chemistry.

The transition metal may be precoordinated to the ligand covalently attached to its support.

Accordingly a second aspect of the invention provides a catalyst for use in the addition polymerisation of olefinically unsaturated monomers; especially vinyl monomers comprising a compound of general formula:

$$[(SD)_cM]^{d+}A$$ 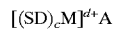 Formula 52 where:
M=a transition metal in a low valency state or a transition metal co-ordinated to at least one co-ordinating non-charged ligand,
S=a support,
D=a compound attached to the support, the compound being capable of complexing with a transition metal,
d=an integer of 1 or 2,
c=an integer of 1 or 2,
A=a monovalent or divalent counter ion, such as Cl, Br, F, I, $NO_3$, $PF_6$, $BF_4$, $SO_4$, CN, SPh.

Preferably M is a defined for Formula 30 above. S may be as defined for Formula 1.

D may be adsorbed or covalently attached to the support.

D may be a compound as described earlier for the first aspect of the invention.

D may have one of the nitrogens as not part of a diimine ring.

D may be a diimine according to Formulae 2–29 as previously defined.

Preferably the catalyst is used with an initiator comprising a homolytically cleavable bond with a halogen atom, as previously defined. Preferred initiators are those defined in the first aspect of the invention according to Formulae 31 to 53.

A third aspect of the invention provides a process for the production of compound such as diimine covalently attached to supports, according to the first or second aspects of the invention.

The invention provides a process for producing a ligand for use in the catalysis of addition polymerisation of olefinically unsaturated monomers, especially vinylic monomers, comprising the steps of:
(a) providing a primary amine functionalised support;
(b) providing a ligand precusor comprising an aldehyde group or ketone group; and
(c) reacting the primary amine functionalised support with the ligand precursor to form a diimine compound covalently attached to the support.

The primary amine of the functionalised support reacts with the aldehyde group or ketone group to form a Schiff base. Accordingly the diimine may be produced by providing a ligand precursor with an aldehyde or ketone group replacing one of the imine groups of the final product, the reaction with the primary amine producing the second imine group. This is shown in the reaction scheme below which shows the reaction of a support functionalised with a primary amine with 2-pyridine carbaldehyde to form a diimine attached to the support according to the first aspect of the invention. This can then be mixed with copper bromide or copper chloride to form a catalyst according to the second aspect of the invention.

Scheme 1

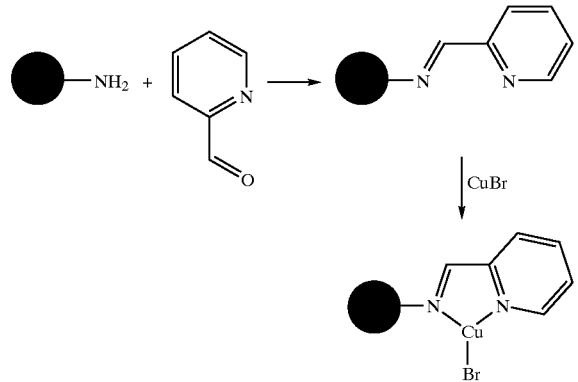

Alternatively an aldehyde or a ketone group may be provided separately on a diimine ligand precursor. Such a suitable precursor is shown in Formula 53

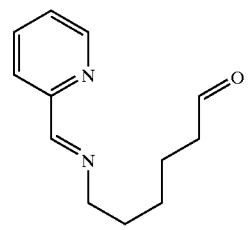

This allows the diimine to be decoupled from the support to allow controlled polymerisation.

Alternatively the following reaction scheme may be followed:

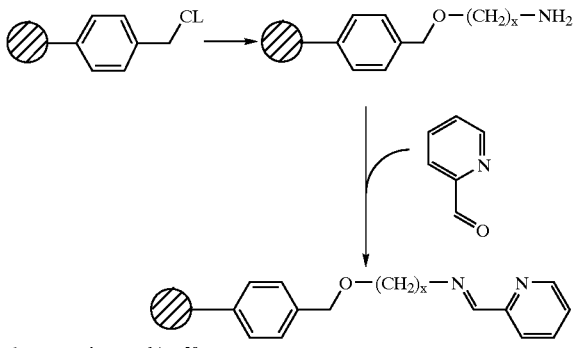

where x = an integer of 1 to 20

The primary amine group may alternatively be provided on the ligand precursor and reacted with a ketone or aldehyde functionalised support.

The support material may be functionalised inorganic material, such as silica, especially silica gel. Alternatively functionalised organic support, especially a functionalised cross-linked polymeric support, such as poly(styrene-w-divinylbenzene) may be used. Such supports are preferably usually used for absorbing compounds or in chromatography.

Preferably the reaction to form the Schiff base occurs at room temperature.

Preferably the functionalised support is an aminopropyl functional silica and the ligand precursor is 2-pyridine carbaldehyde.

The supported ligands and supported catalysts of the invention may be used in batch reactions or in continuous reactions to polymerise olefinically unsaturated monomers. In the latter case, the supported catalyst or ligand may be packed into columns and the reaction mixture passed through.

The supported ligand or supported catalyst may be conveniently removed from a reaction mixture by, for example, filtration, precipitation or centrifugation. Alternatively the support may be magnetised beads and the catalyst is removed by means of a magnet.

The invention also provides the use of the catalyst according to the first or second aspect of the invention in the addition polymerisation of one or more olefinically unsaturated monomers and the polymerised products of such processes.

The components may be used together in any order.

The inventors have unexpectedly found that the catalyst will work at a wide variety of temperatures, including room temperature and as low as −15° C. Accordingly, preferably the catalyst is used at a temperature of −20° C. to 200° C., especially −20° C. to 150° C., 20° C. to 130° C., more preferably 90° C.

The olefinically unsaturated monomer may be a methacrylic, an acrylate, a styrene, methacrylonitrile or a diene such as butadiene.

Examples of olefinically unsaturated monomers that may be polymerised include methyl methacrylate, vinylacetate, vinyl chloride acylonitonile, methacylamide, acrylamide, ethyl methacrylate, propyl methacrylate (all isomers), butyl methacrylate (all isomers), and other alkyl methacrylates; corresponding acrylates; also functionalised methacrylates and acrylates including glycidyl methacrylate, trimethoxsysilyl propyl methacrylate, allyl methacrylate, hydroxyethyl methacrylate, hydroxypropyl methacrylate, dialkylaminoalkyl methacrylates; fluoroalkyl (meth)acrylates; methacrylic acid, acrylic acid; fumaric acid (and esters), itaconic acid (and esters), maleic anhydride; styrene, α-methyl styrene; vinyl halides such as vinyl chloride and vinyl fluoride; acrylonitrile, methacrylonitrile; vinylidene halides of formula $CH_2=C(Hal)_2$ where each halogen is independently Cl or F; optionally substituted butadienes of the formula $CH_2=C(R_{15})C(R^{15})=CH_2$ where $R^{15}$ is independently H, $C_1$ to $C_{10}$ alkyl, Cl, or F; sulphonic acids or derivatives thereof of formula $CH_2=CHSO_2OM$ wherein M is Na, K, Li, $N(R^{16})_4$ where each $R^{16}$ is independently H or $C_1$ to $C_{10}$ alkyl, D is COZ, ON, $N(R^{16})_2$ or $SO_2OZ$ and Z is H, Li, Na, K or $N(R^{16})_4$; acrylamide or derivatives thereof of formula $CH_2=CHCON(R^{16})_2$; and methacryiamide or derivative thereof of formula $CH_2=C(CH_3)CON(R^{16})_2$. Mixtures of such monomers may be used.

Preferably, the monomers are commercially available and may comprise a free-radical inhibitor such as 2,6-di-tert-butyl-4-methylpenol or methoxyplenol.

Preferably the co-catalysts are used in the ratios 0.01 to 1000 D: MY, preferably 0.1 to 10, and compound MY: initiator 0.0001 to 1000, preferably 0.1 to 10, where the degree of polymerisation is controlled by the ratio of monomer to (b) (expressed as molar ratios).

Preferably the components of the catalyst of the second aspect of the invention are added at a ratio M:initiator of 3:1 to 1:100.

Preferably the amount of diimine: metal used in the systems is between 1000:1 and 1:1, especially, 100:1 and 1:1, preferably 5:1 to 1:1, more preferably 3:1 to 1:1.

The ratio of RX:Copper is 1000:1 to 1:1, especially 100:1 to 1:1.

The reaction may take place with or without the presence of a solvent. Suitable solvents in which the catalyst, monomer and polymer product are sufficiently soluble for reactions to occur include water, protic and non-protic solvents including propionitrile, hexane, heptane, dimethoxyethane, diethoxyethane, tetrahydrofuran, ethylacetate, diethylether, N,N-dimethylformamide, anisole, acetonitrile, diphenylether, methylisobutyrate, butan-2-one, toluene and xylene. Especially preferred solvents are xylene and toluene, preferably the solvents are used at at least 1% by weight, more preferably at least 10% by weight.

Preferably the concentration of monomer in the solvents is 100% to 1%, preferably 100% to 5%.

The reaction may be undertaken under an inert atmosphere such as nitrogen or argon.

The reaction may be carried out in suspension, emulsion, mini-emulsion or in a dispersion.

Statistical copolymers may be produced using the catalysts according to the invention. Such copolymers may use 2 or more monomers in a range of ca.0–100% by weight of each of the monomers used.

Block copolymers may also be prepared by sequential addition of monomers to the reaction catalyst.

Telechelic polymers, may be produced using catalysts of the invention. For example, a functional initiator such as Formula 21 may be used with transformation of the w-Br group to a functional group such as —OH or —CO$_2$H via use of a suitable reactant such as sodium azide.

Comb and graft copolymers may be produced using the catalysts of the invention to allow, for example, polymers having functional side chains to be produced, by use of suitable reagents.

BRIEF DESCRIPTION OF THE DRAWINGS

Embodiments of the invention will now be described by way of example and with reference to the following figure.

[MMA]:[Cu]:[Si-lig]:[E2 BI]=100:1:3:1

Figure 5:
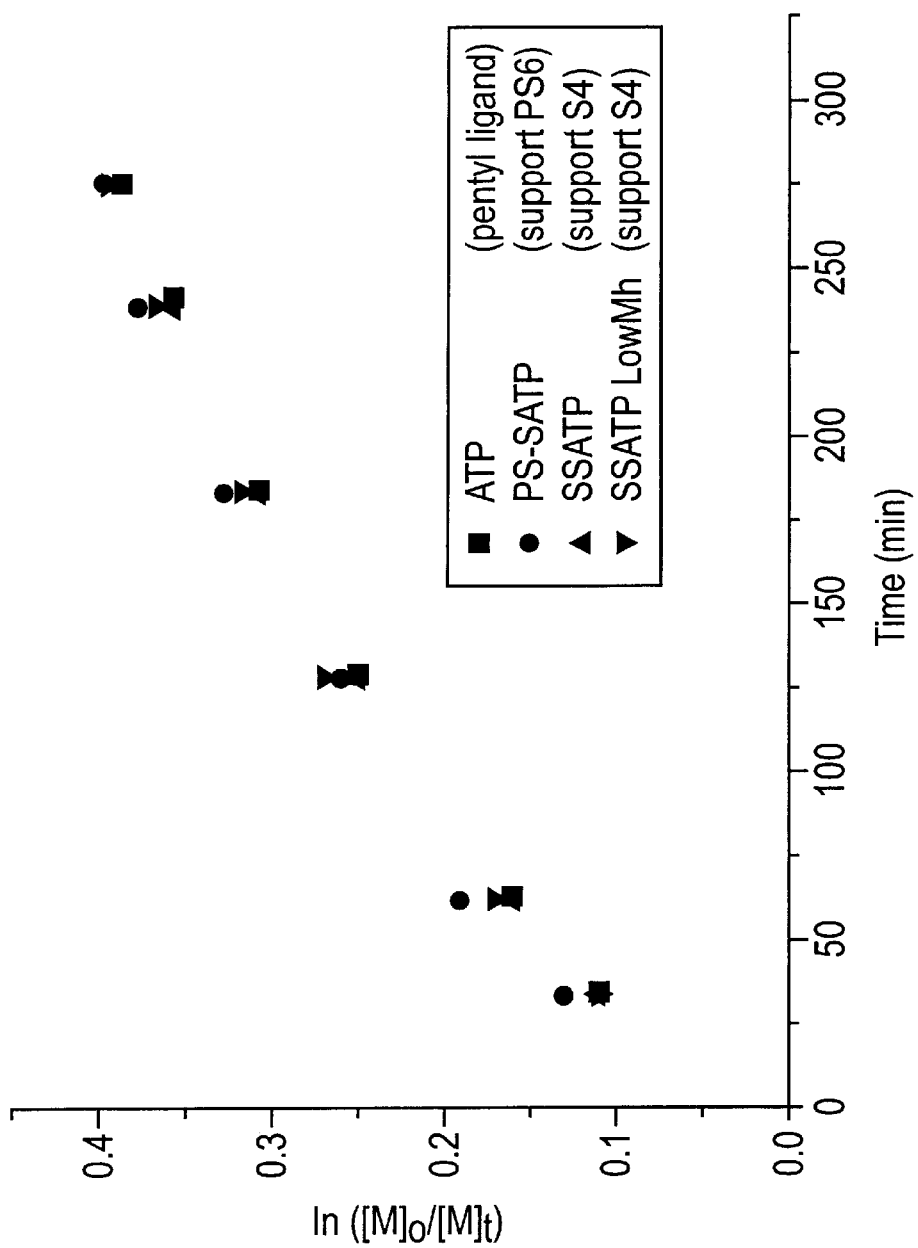

FIG. 5 shows reinitiation of PMMA.

DETAILED DESCRIPTION OF THE INVENTION

Reagents:

Methyl methacrylate (Aldrich, 99%) was purified by passing through a column of activated basic alumina to remove inhibitor. Copper(I) bromide (Aldrich, 98%) was purified according to the method of Keller & Wycoff. Toluene (Fisons, 99.8%) was dried over sodium. Ethyl-bromoisobutyrate (Aldrich, 9%), 2-pyridene carboxaldehyde, 3-aminipropyl-functionalised silica gel (Aldrich, 98% functionalised), silica gel (Merck), and diethyl ether (BDH, 98%) were used as received.

Ref: Keller, R. N.; Wycoff, H. D. *Inorg. Synth.* 2,1 (1946)

Characterisation:

Conversion was measured by gravimetry, and molecular weight distributions were measured using size exclusion chromatography (SEC) on a system equipped with a guard column, a mixed E column (Polymer Laboratories) and a refractive index detector, using tetrahydrofuran at 1 mL.min$^{-1}$ as an eluent. Poly(MMA) standards in the range ($10^6$–200 g.mol$^{-1}$) were used to calibrate the SEC.

SiO$_2$ Supported Catalyst-covalently Bound Schiff Bases

EXAMPLE 1

Figure 1:
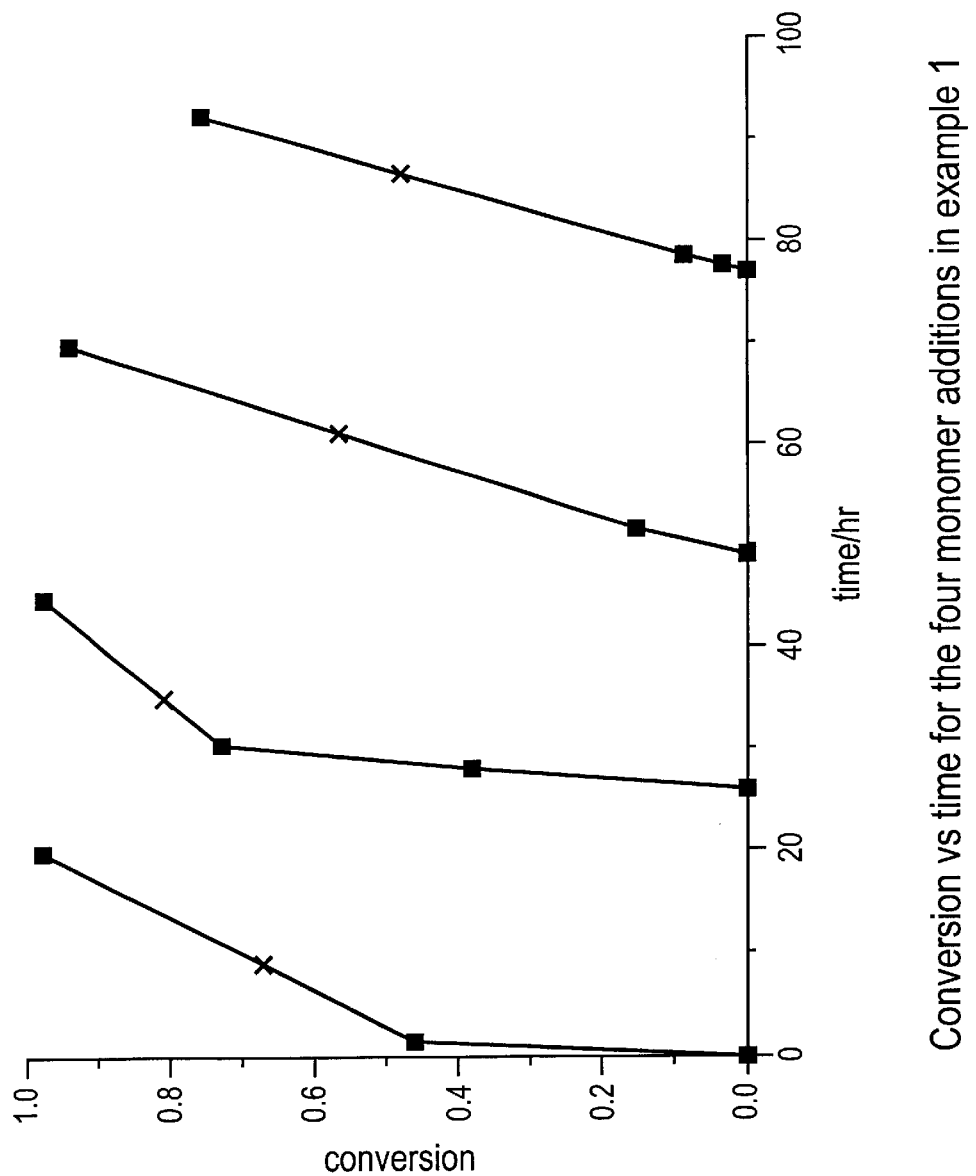
FIG. 1 show the polymerisation of methylmethacrylate for four monomer additions to supported catalyst which has been collected at the end of each previous polymerisation reaction.

2-pyridine carboxaldehyde (0.714 g, 6.67×10$^{-3}$ mol) was added to 3-aminopropylfunctionalised silica gel (3.00 g, 3.15×10$^{-3}$ mol of active NH$_2$) dispersed in diethyl ether (50 mL) and stirred for 1 hr. The diethyl ether was removed and the ligand functionalised silica gel washed with two aliquots of diethyl ether (50 mL), and dried under vacuum. The ligand functionalised silica gel was added to a Schlenk flask and purged with nitrogen. To this, a solution of toluene (30 g), MMA (10 g) and ethyl 2-bromoisobutyrate (0.138 g) that was degassed by three freeze-pump-thaw cycles, was added. This was followed by the addition of copper(I) bromide (0.144 g). The addition copper(I) bromide results in the SiO$_2$ supported catalyst. Agitation was effected by a magnetic stirrer. The mixture was then placed in an oil bath at 90° C. to commence reaction. Samples were taken periodically for conversion and molecular weight analysts. After approximately 20 hr the mixture was cooled to room temperature and the SiO$_2$ supported catalyst allowed to settle. The polymer solution was removed via cannula, and the SiO$_2$ supported catalyst washed with two aliquots of toluene (50 mL). To this, another solution of toluene, MMA and ethyl 2-bromoisobutyrate was added (concentrations as per previous solution) and the mixture placed in oil bath at 90° C. This procedure was repeated for two more monomer additions, demonstrating that the SiO$_2$ supported catalyst could be used at least four times for consecutive reactions. The results are shown in table 1 and FIG. 1.

Poly(stryene-w-divinylbenzene) Supplied Catalyst-covaltently Bound Schiff Base

EXAMPLE 2

2-pyridine carboxaldehyde (0.5 g, 6.67×10$^{-3}$) was added to aminofunctionalised cross-linked polystryene beads (1.30 g) dispersed in tetrahydrofuran (50 mL) and stirred for 1 hr. The tetrahydrofuran was removed and the ligand functionalised polystryene beads washed with two aliquots of tetrahydrofuran (50 mL) and dried under vacuum. The ligand functionalised polystryene was added to a Schlenk flask and purges with nitrogen. To this, a solution of toluene (12 g), MMA (4.0 g) and ethyl 2-bromoisbutyrate (0.075 g), that was degassed by three freeze-pump-thaw cycles, was added. This was followed by the addition of copper(I) bromide (0.057 g). The addition copper(I) bromide produced the polystyrene supported catalyst. Agitation was effected by a magnetic stirrer. The mixture was then placed in an oil bath at 90° C. to commence reaction. Samples were taken periodically for conversion and molecular weight analysis. After approximately 20 hr the mixture was cooled to room temperature and the polystyrene supported catalyst allowed to settle. The polymer solution was removed via cannula. The results are shown in table 1 and FIG. 2.

SiO$_2$ Adsorbed Catalyst

EXAMPLE 3

A solution of toluene (21 g), MMA (7.1 g), ethyl 2-bromoisobutyrate (0.139 g) and N-$^n$octyl pyridylmethanimine (0.465 g) that was degassed by three freeze-pump-thaw cycles, was added to Schlenk flask containing silica gel (3.0 g).

To this, copper(I) bromide (0.095 g) was added. Agitation was effected by a magnetic stirrer. The mixture was then placed in an oil bath at 90° C. to commence reaction. Samples were taken periodically for conversion and molecular weight analysis. After approximately 20 hr the mixture was cooled to room temperature and the SiO$_2$ adsorbed catalyst allowed to settle. The polymer solution was removed via cannula. The results are shown in table 1.

SiO$_2$ Adsorbed Catalyst (II)—Non Covalently Bound on Amino Functionalised Silica

EXAMPLE 4

A solution of toluene (21 g), MMA (7.1 g), ethyl 2-bromoisobutyrate (0.139 g) and N-$^n$octyl pyridyimethamine (0.465 g) that was degassed by three freeze-pump-thaw cycles, was added to Schlenk flask containing 3-aminopropyl-functionalised silica gel (3.0 g). To this, copper(I) bromide (0.095 g) was added. Agitation was effected by a magnetic stirrer. The mixture was then placed in an oil bath at 90° C. to commence reaction. Samples were taken periodically for conversion and molecular weight analysis. After approximately 20 hr, the mixture was cooled to room temperature and the SiO$_2$ adsorbed catalyst allowed to settle. The polymer solution was removed via cannula.

The results are shown in table 1.

TABLE 1

| Example | Time/Hr | Conversion | Mn | Mw | PDI |
|---|---|---|---|---|---|
| 1A | 1.33 | 0.458 | 21400 | 45800 | 2.14 |
| 1B | 20 | 0.98 | 21000 | 45600 | 2.18 |
| 1C | 26 | — | — | — | — |
| 1D | 28 | 0.38 | 13600 | 40400 | 2.97 |
| 1E | 30.5 | 0.726 | 18600 | 44600 | 2.39 |
| 1F | 45 | 0.976 | 18700 | 46300 | 2.48 |
| 1G | 49.25 | — | — | — | — |
| 1H | 51.75 | 0.149 | 25000 | 46100 | 1.85 |
| 1I | 70 | 0.942 | 24800 | 49600 | 2.00 |
| 1J | 77.25 | — | — | — | — |
| 1K | 77.83 | 0.031 | 21200 | 38500 | 1.81 |
| 1L | 78.75 | 0.085 | 18300 | 37300 | 2.03 |
| 1M | 92.5 | 0.760 | 11200 | 32200 | 2.87 |
| 2A | 1 | 0.388 | 9030 | 17600 | 1.95 |
| 2B | 2.33 | 0.681 | 11500 | 18900 | 1.64 |
| 2C | 3.58 | 0.876 | 12800 | 21300 | 1.67 |
| 2D | 17.92 | 0.986 | 13300 | 22600 | 1.70 |
| 3A | 1 | 0.446 | 8950 | 15000 | 1.67 |
| 3B | 2.33 | 0.666 | 10600 | 17000 | 1.61 |
| 3C | 3.58 | 0.753 | 10200 | 15200 | 1.50 |
| 3D | 17.92 | 0.817 | 10600 | 15800 | 1.50 |
| 4A | 1 | 0.702 | 11400 | 20200 | 1.76 |
| 4B | 2.33 | 0.891 | 5970 | 19700 | 3.31 |
| 4C | 3.58 | 0.906 | 11800 | 21100 | 1.79 |
| 4D | 17.92 | 0.922 | 11300 | 20800 | 1.84 |

| | Time (min) | Conversion (%) | $M_n$ | $M_w$ | PDi |
|---|---|---|---|---|---|
| 5A | 120 | 59 | 8600 | 15400 | 1.78 |
| 5B | 300 | 83 | 9700 | 15600 | 1.61 |
| 5C | 1380 | 96 | 11300 | 19200 | 1.70 |

| | Time (min) | Conversion % | Mn | Mw | PDi |
|---|---|---|---|---|---|
| 6A | 120 | 6.9 | 209000 | 336000 | 1.61 |
| 6B | 300 | 15.1 | 192000 | 341000 | 1.775 |
| 6C | 1380 | 74.2 | 84700 | 225000 | 2.65 |

EXAMPLE 7

$RhCl_3 (H_2O)_3$ on 3-Aminopropyl-functionalised Silica Gel 0.122 g $RhCl_3(H_2O)_3$ ($4.65 \times 10^{-4}$ mol) together with 1.86 g ($1.395 \times 10^{-3}$ mol) 3-aminpropyl-functionalised silica gel (~9% functionalised; ~1.05 mmol $NH_2$/gram) was added to a schlenk and subjected to three vacuum argon cycles. To this mixture was added 5 ml degassed MMA ($4.65 \times 10^{-2}$ mol) and 15 ml degassed xylene and the mixture heated to 90° C. and stirred. The polymerisation reaction was initiated by the addition of ethyl-2-bromoisobutyrate, 0.069 ml ($4.65 \times 10^{-4}$ mol), and the timer was started.

| | Time (min) | Conversion | Mn | Mw | PDi |
|---|---|---|---|---|---|
| 7A | 120 | 6.1 | 93600 | 314000 | 3.35 |
| 7B | 300 | 21.5 | 17900 | 320000 | 1.78 |
| 7C | 1380 | 68.7 | 89100 | 243000 | 2.72 |

EXAMPLE 5

$Ru(PPh_3)_3Cl_2$ on 3-Aminopropyl-functionalised Silica Gel 0.14 g $Ru(PPh_3)_3$ ($1.461 \times 10^{-4}$ mol) together with 0.558 g ($5.84 \times 10^{-4}$ mol) 3-aminopropyl-functionalised silica gel (~9% functionalised; ~1.05 mmol $NH_2$/gram) was added to a schlenk and subjected to three vacuum-argon cycles. To this mixture was added 1.5 ml degassed MMA ($1.395 \times 10^{-2}$ mol) and 5 ml degassed xylene and the mixture heated to 96° C. and stirred. The polymerisation reaction was initiated by the addition of ethyhl-2-bromoisobutyrate, 0.021 ml ($1.430 \times 10^{-4}$ mol), and the timer was started.

Samples were removed at regular intervals and the percentage conversion and molecular weight of the product polymer determined (conversions were by $^1$H NMR).

EXAMPLE 6

$RuCl_3$ on 3-Aminopropyl-functionalised Silica Gel 0.095 g $RuCl_3$ $4.65 \times 10^{-6}$ mol) together with 1.86 g ($1.395 \times 10^{-3}$ mol) 3-aminopropyl-functionalised silica gel (~9% functionalised; ~1.05 mmol $NH_2$/gram) was added to a schlenk and subjected to three vacuum/argon cycles. To this mixture was added 5 ml degassed MMA ($4.65 \times 10^{-2}$ mol) and 15 ml degassed xylene and the mixture heated to 90° C. and stirred. The polymerisation reaction was initiated by the addition of ethyl 2-bromoisobutyrate, 0.069 ml ($4.65 \times 10^{-4}$ mol), and the timer was started.

EXAMPLE 8

$Ag(CF_3CO_3)$ on 3-Aminopropyl-functionalised Silica Gel 0.10 g $Ag(CF_3CO_2)$ ($4.65 \times 10^{-4}$ mol) together with 1.86 g ($1.395 \times 10^{-3}$ mol) 3-aminoproply-functionalised silica gel (~9% functionalised; ~1.05 mmol $NH_2$/gram) was added to a schlenk and subjected to three vacuum/argon cycles. To this mixture was added 5 ml degassed MMA ($4.65 \times 10^{-2}$ mol) and 15 ml degassed xylene and the mixture heated to 90° C. and stirred. The polymerisation reaction was initiated by the addition of ethyl 2-bromoisobutyrate, 0.069 ml ($4.65 \times 10^{-4}$ mol) and the timer was started.

| | Time (min) | Conversion | Mn | Mw | PDi |
|---|---|---|---|---|---|
| 8A | 120 | 2.6 | 61200 | 226000 | 3.68 |
| 8B | 300 | 13.4 | 149000 | 324000 | 2.18 |
| 8C | 1380 | 41.8 | 148000 | 299000 | 2.01 |

The precursor shown to Formula 53 may be produced by reacting 2-pyridine carbaldehyde with an α-aminocarboxylic acid, such as 8-amino caprylic acid, followed by mild reduction or by coupling of the parent acid through an amide link. It is envisaged that the use of amino acids will allow the incorporation of asymetry into the system.

Synthesis of Polystyrene Support

The pyridyl route

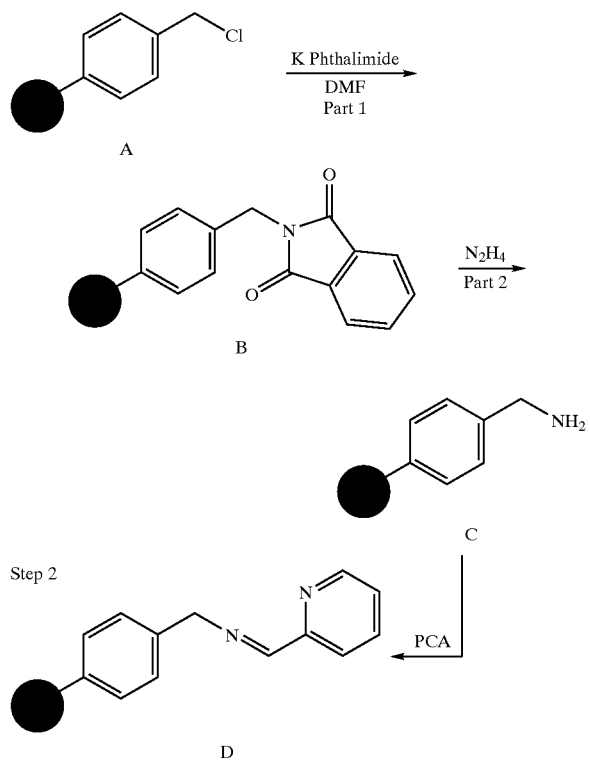

Scheme.
The pyridyl route to ligand
functionalised polystyrene support

Step 1

Step 2

Analysis of Support

TABLE

Infrared peak assignments for polystyrene supported ligands synthesised following the pyridyl route

| Support | type | functional groups | IR peak assignment (cm$^{-1}$) |
|---|---|---|---|
| A | chloromethylated | CH2—Cl | 1250 |
| B | Phthalimido functions | C=O | 1710, 1770 |
| C | amino functions | NH2 | 1630, 3200 |
| D | ligand functions | C=N | 1490, 1600, 1660 |

Figure 2:
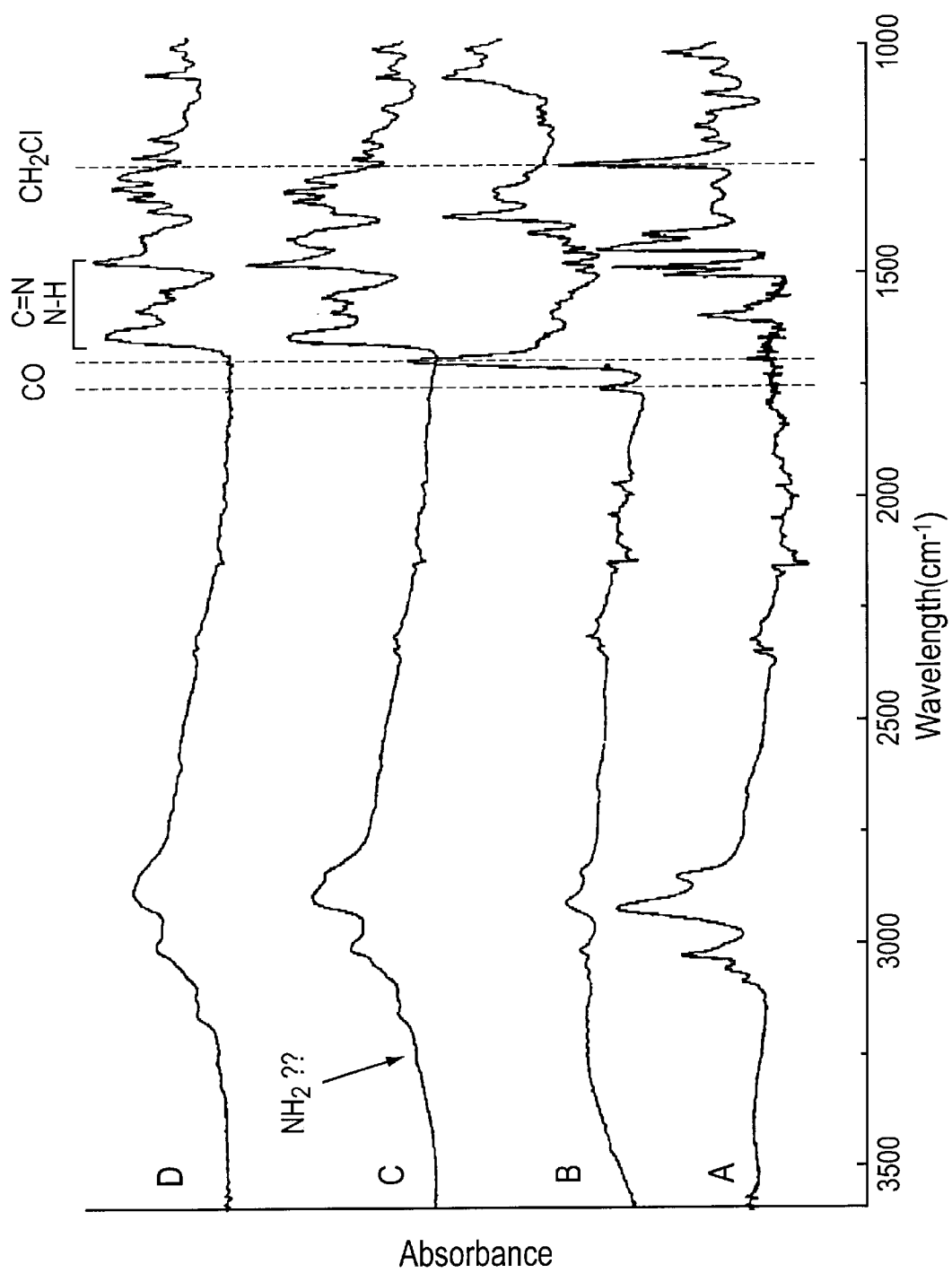
FIG. 2 shows infrared spectra for the stepwise synthesis of pyridyl ligand onto cross-linked polystyrene beads.

FIG. 2 shows infrared spectra for the stepwise synthesis of the pyridyl ligand onto cross-linked polystyrene beads. Typical Procedure for the Synthesis of Support PSS, PS6 and PS7

Step 1-Part1: Plthalimidomethylated Cross-linked Polystyrene Beads (B)

To a stirred suspension of cross-linked chloromethylated beads (3 g, 12 mmol) in DMF (100 ml) was added potassium phthalimide (11.19 g, 60.4 mmol) and the reaction mixture was heated at 110° C. for 7 h. After cooling, toluene (100 ml) was added and the reaction mixture was filtrated then washed with water (100 ml), methanol (100 ml) and diethyl ether (100 ml). The solid was dried under vacuum at RT for one day, then at 60° C. overnight in a vacoven. Product: white solid (4.15 g).

IR absorption: 1710, 1770 cm-1(v C=O). Elemental analysis: 80.64% C, 5.85% H, 3.49% N (theoretical; 81.43% C, 5.82% H, 3.88% N).

Step 1-Part 2: Aminomethylated Cross-linked Polystyrene Beads (C)

To a stirred suspension of phthalimide derivative (4.07 g, 16.3 mmol) in ethanol (150 ml) was added hydrazine monohydrate (4.6 ml, 0.147 mol). The reaction mixture was heated at 80° C. for 3 h then cooled to room temperature and left overnight (careful, once the hydrazine has been added, you need enough solvent to compensate the swelling of the beads). Then the reaction mixture was filtered and the solid washed with water (100 ml), methanol (50 ml) and diethyl

TABLE

Comparison of synthesis techniques and characterisation of polystyrene supports synthesized via the pyridyl route.

| n° | type | Step 1 part 1* | Step 1 part 2** | Step 2*** | n ligand/g by NMR (% vs th) | n Cu/g by ICP (% vs theory) | % retention between ICP and NMR |
|---|---|---|---|---|---|---|---|
| PS1 | PS | 1 | 1 | 1 | 1.75 × 10$^{-3}$ (55.7) | 1.38 × 10$^{-3}$ (63.5) | 98.5 |
| PS2 | PS | 1 | 2 | 2 | 2.32 × 10$^{-3}$ (71) | 5.82 × 10$^{-4}$ (26.8) | 33.4 |
| PS3 | PS | 2 | 2 | 2 | 3.09 × 10$^{-3}$ (98.5) | ? | ? |
| PS4 | PSm | 2 | 3 | 2 | 1.27 × 10$^{-3}$ (40.4) | ? | ? |
| PS5 | PSp | 2 | 2 | 2 | 2.84 × 10$^{-3}$ (90.7) | ? | ? |
| PS6 | PSp | 2 | 2 | 2 | 2.77 × 10e$^{-3}$ (88.6) | 1.39 × 10$^{-3}$ (80.6) | 87.8 |
| PS7 | PSp | 2 | 2 | 2 | 2.94 × 10$^{-3}$ (94) | 1.44 × 10$^{-3}$ (66.9) | 69.9 |

*Step 1-part 1: 1 = DMF, 50° C.; 2 = DMF, 110° C.
**Step 1-part 2: 1 = DMF, RT; 2 = EtOH, 80° C.; 3 = DMF, 90° C.
***Step 2: 1 = Et2O, RT; 2 = Toluene, 130° C., soxhlet; 3 = Toluene, RT ether (50 ml). The solid was dried under vacuum at RT for one day, then at 60° C. overnight in a vacoven. Product: white solid (3.24 g).

IR absorption: 1650, 1600, 1490 cm−1 (ν N—H?). Elemental analysis: 76.61% C, 6.56% H, 8.48% N (theoretical; 85.7% C, 8.22% H, 6.06% N).

Step 2: Pyridiniminemthylated Cross-linked Polystyrene Beads (D)

To a suspension of amino derivated support C (1.94 g, 7.74 mmol $NH_2$) in toluene (50 ml) was added pyridine carbaldehyde (1.661 g, 15.3 mmol). The mixture was heated under reflux (130° C.) in a soxhlet extractor in which the thimble contained 3A molecular sieves. The support was removed by filtration and washed successively with THF (50 ml), methanol (50 ml) and diethyl ether (50 ml) to give, after drying under reduced pressure at RT and 60° C. overnight to constant weight, an orange solid (2.18 g).

IR absorption: 1650, 1600, 1490cm−1 (ν C=N). Elemental analysis: 81.06% C, 6.5% H, 8.05% N (theoretical; 84.36% C, 6.88% H, 8.75% N).

The (di)Amine Route

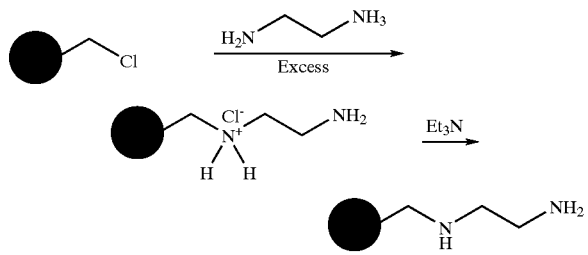

Scheme
Example of cross-linked polystyrene beads functionalisation with ethylene diamine

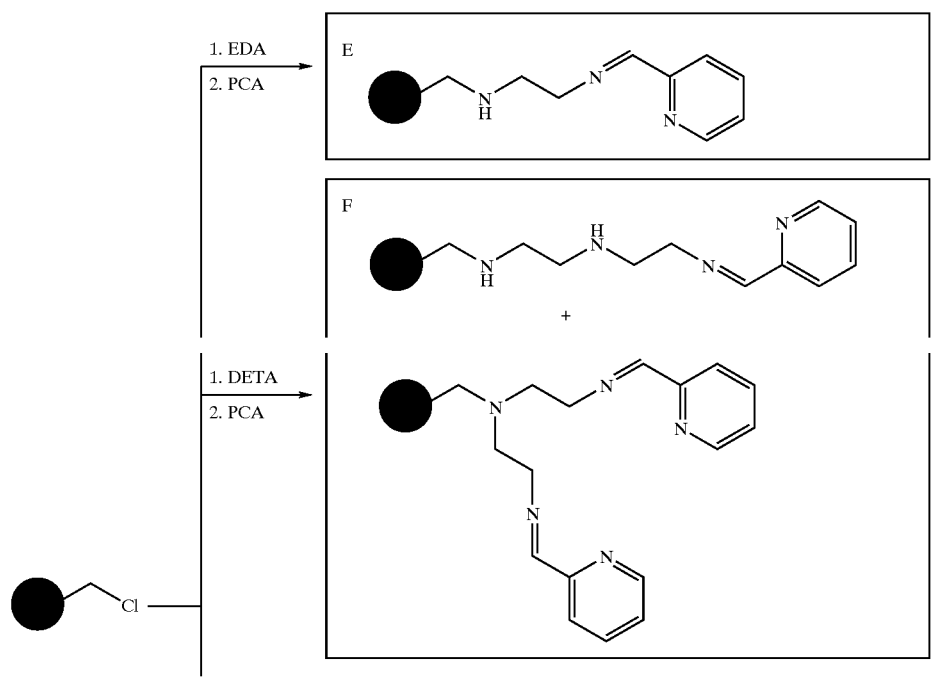

Scheme.
The different cross-linked polystyrene beads supported ligand obtained from the (di)amine route.

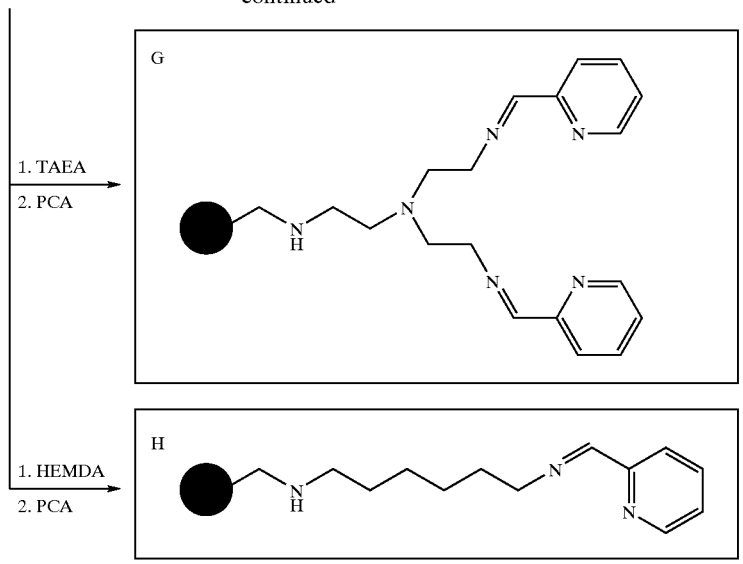

TABLE

Summary of cross-linked polystyrene supports synthesised following the (di)amine route.

| Support | Support code | Amine used | Amine functionalisation reaction | n ligand/g by NMR (% vs th) |
|---|---|---|---|---|
| E | PS-EDA-lig | ethylene diamine | DA1 | $2.75e^{-3}$ (99.7) |
| F | PS-DETA-lig | diethylene triamine | DA1 | $4.02e^{-3}$ (99.5) |
| G | PS-TAEA-lig | tris(2-aminoethyl)-amine | DA3 | $2.63e^{-3}$ (70.8) |
| H | PS-HEMDA-lig | hexamethylene-diamine | DA2 | ? |

Procedure for Synthesis of PS Supports Following the (di)Amine Route

Synthesis DA1: (Supports E & F)

A suspension of chloromethylated cross-linked polystyrene beads (3 g, 4 mmol of Cl/g resin, 12 mmol) was shaken in round bottom flask with 15 ml amine during one day at room temperature. The polymer was filtered and successively rinsed two times with 10% trietylamine in dimethylformamide, once with DMF, four times with 10% Et3N in tetrahydrofuran, three times with THF and three times with methanol. The solid was then dried under vacuum at RT then at 80° C. in the vacoven to constant weight.

Synthesis DA2: (Support H)

Same as DA1 but the amine is mix with 100 ml DMF in order to solubilised it.

Synthesis DA3: (Support G)

A suspension of chloromethylated cross-linked polystyrene beads (3 g, 4 mmol of Cl/g resin, 12 mmol) in DMF (100 ml) was shaken in round bottom flask with tris(2-aminoetyl)amine (5 ml, 33.4 mmol) for 6 h at 65° C. under N2 atmosphere. After cooling to room temperature, the resin was filtered and washed successively with two times with 10% triethylamine in dimethylformamide, once with DMF, four times with 10% Et3N in tetrahydrofuran, three times with THF and three times with methanol. The solid was then dried under vacuum at RT then at 80° C. in the vacoven to constant weight.

The amino-hexanol route of pyridine carbaldehyde, leading to the spaced supported ligand.

Scheme. Two different ways to the synthesis of hexenoxy supported ligand

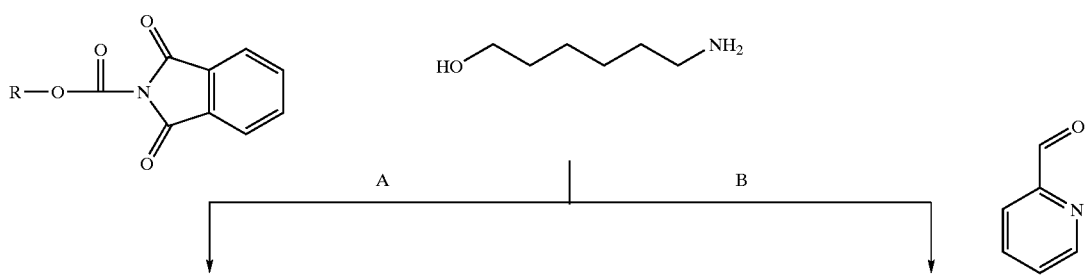

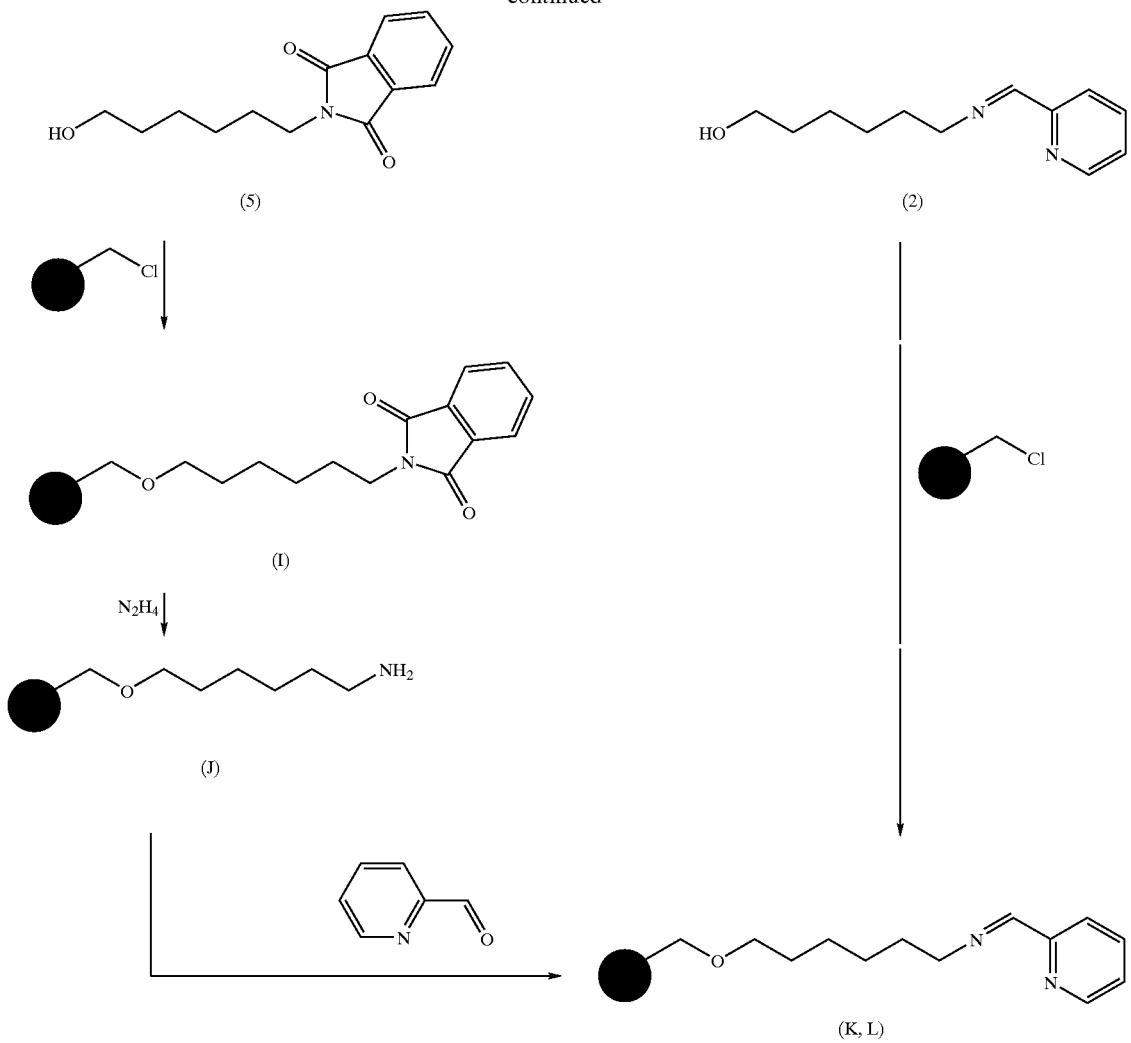

TABLE

Functionalisation of supports synthesised following the amino-hexanol route

| Support | n ligand/g by NMR (% vs th) | n Cu/g by ICP (% vs theory) | % retention between ICP and NMR |
|---|---|---|---|
| K1 | 2.13 × 10⁻³ (90) | 1.43 × 10⁻³ (80.5) | 87.6 |
| K2 | 2.16 × 10⁻³ (91) | 1.12 × 10⁻³ (63.1) | 68 |
| L | ? | 9.25 × 10⁻⁴ (52.1) | ? |

Procedure for Synthesis of Polystyrene Supports Via the Amino-hexanol Route.

N-$^n$Hexanehydroxy-2-pyridine Methanimine (2):
6-Phthalimido-1-hexanol (5):

A solution of 6-amino-1-hexanol (7.54 g, 62.4 mmol) in 15 ml THF was added to a stirred slurry of N-(ethoxycarbonyl)phthalimide (14.08 g, 63 mmol) in 50 ml THF at 0° C. (ice-water bath) with a pressure equalising funnel. After 5 minutes, the bath was removed and the mixture stirred overnight at ambient temperature. After removal of the solvent under reduce pressure, the compound was distillated (0.4 Torr) to give ethyl carbamate. The residue was put through a crystallisation procedure from a solution of toluene (25 ml) and hexane (10 ml) but the product stayed oily. The crystallisation started with scratching the product with spatula to give a light brown solid (13.9 g, 90% yield).

$^1$H NMR: δ=7.81, 7.71 (m, 4H); 3.61 (m, 4H); 2.3 (s, 1H); 1.68, 1.39 (overlapping multiplets, 8H). Elemental analysis: 67.8% C, 6.9% H, 5.7% N (theoretical; 68% C, 6.93% H, 5.66% N), Route A: Phthalimidohexanoxy methylated cross-linked polystyrene beads (I):

To a slurry of potassium hydride (0.81 g, 33.7 mmol) and tetrahydrofuran (100 ml) was added, with stirring, a solution of 6-plithalimido-1-hexanol (5) (5.92 g, 23.9 mmol), dibenzo-18-crown-6 (200 mg, 0.56 mmol) and hexamethylphosphoric triamide (10 ml). After 1 hour at ambient temperature, a slurry of chloromethylated polystyrene beads (3 g, 12 mequiv. Cl) in tetrahydrofuran (50 ml) was added. The reaction mixture was stirred and heated under reflux for 48 hours. The polymer was separated by filtration and washed successively with solutions of tetrahydrofuran/ethanol (1/1), tetrahydrofuran/methanol (1/1) and then with diethyl ether. The polymer was dried under reduce pressure to constant weight to give a white solid (4.36 g, ~60%).

IR absorption: 1710, 1770 cm−1 (v C=O),1075 cm−1 (v C—O—C).

Route A: Aminohexanoxy Methylated Cross-linked Polystyrene Beads (J):

Same procedure as for support C.

Route A: Pyridinimenehexanoxy Methylated Cross-linked Polystyrene Beads (K):

Same procedure as for support D.

IR absorption: 1650 cm−1 (v C=N).

Route B: Pyridiniminehexanoxy Methylated Cross-linked Polystyrene Beads (L):

Same procedure as for support I, replacing phthalimidohexanol (5) by N-″hexanehydroxy-2-pyridine methanimine (2).

IR absorption: 1650 cm−1 (v C=N).

Synthesis of Silica Support

Scheme. Two different silica supports synthesised by direct condensation of pyridine carbaldehyde onto the primary supported amine.

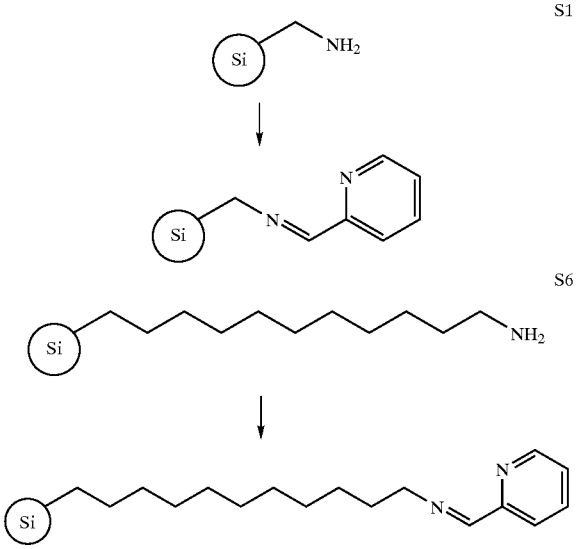

Supports S1 to S4 were found to be bright orange solids, although S5 was light yellow and S6 beige. Supports S1 to S5 were easily complexing copper bromide in methanol (black colour of the support). It took time to notice a change of colour for S6, when trying to complex CuBr.

TABLE

Comparison of synthesis routes and characterisation of silica supported ligands.

| Silica support | Step 2[a] | n ligand/g by NMR (% vs th) | n Cu/g by ICP (% vs theory) | % retention between ICP and NMR |
|---|---|---|---|---|
| S1 | 2[b] | 1.04 e−3 (>100) | 7.08 e−3 (84) | 84 |
| S2 | 2 | 1.15 e−3 (>100) | 7.92 e−4 (93.8) | 93.8 |
| S3 | 2 | 1.16 e−3 (>100) | ? | ? |
| S4 | 2 | 1.16 e−3 (>100) | 7.22 × 10−4 (85.6) | 85.6 |
| S5 | 3 | 9.88 e−3 (>100) | ? | ? |
| S6 | 1 | ? | ? | ? |

[a]Step 2: 1 = Et2O, RT; 2 = Toluene, 130° C., soxhlet, 3 = Toluene, RT

[b]Step 2 method 2: Typically mixture of 3-aminopropyl silica gel (15 g, 15.75 mmol) in toluene (150 ml) with pyridine carbaldehyde (3.6 g, 33 mmol).

Silica Supported Atom Transfer Polymerisation

In a typical SSATP reaction, CuBr (0.134 g, 9.34×10−4 mol) and the support (x grams, depending on the experimentally calculated loading of ligand onto the support; [Si-lig]:[Cu]=n:1, where [Si-lig] is the concentration of ligand anchored to the silica support and n=1, 2, 3, 4) were placed in a predried Schlenk flask which was evacuated and then flushed with nitrogen three times. Deoxygenated toluene (20 ml, 66% v/v) and deoxygenated methyl methacrylate (10 mL, 9.36×10−2 mol) were added and the suspension stirred. The flask was heated in a thermostatted oil bath at 90° C. and when the temperature had equilibrated ethyl-2-bromoisobutyrate (0.137 mL, 9.34×10−4 mol, [MMA]0:[In]0=100:1) was added. Samples (1–2 ml) were taken periodically after initiator was added. Conversions were calculated by gravimetry heating sample to constant weight overnight at 90° C. under vacuum. The polymer was then diluted in THF and passed through basic aluminum oxide in order to remove the copper catalyst which has gone into solution.

TABLE

Silica Supported Atom Transfer Polymerisations of MMA in toluene

| Type[a] | Support[b] | [lig]/[Cu] | Time (min) | Conv. (%) | $Mn_{th}$[d] (g/mol) | $Mn_{(SEC)}$ (g/mol) | PDI |
|---|---|---|---|---|---|---|---|
| ATP1 | / | 2 | 60 | 15 | 1 500 | 3 430 | 1.14 |
|  |  |  | 360 | 80 | 8 010 | 9 050 | 1.11 |
| SS1 | SiNH2[c] | 1 | 60 | 13 | 1 300 | 18 2800 | 2.1 |
|  |  |  | 300 | 34 | 3 400 |  |  |
| SS2 | SiNH2 | 2 | 60 | 19 | 1 900 |  |  |
|  |  |  | 300 | 52 | 5 200 | 146 300 | 1.94 |
| SSATP 1 | S1 | 1 | 60 | 27 | 2 700 | 19 700 | 1.63 |
|  |  |  | 360 | 67 | 6 700 | 18 500 | 1.8 |
| SSATP 2 | S2 | 1 | 60 | 33 | 3 300 | 12 250 | 1.59 |
|  |  |  | 360 | 75 | 7 510 | 15 950 | 1.56 |
| SSATP 3 | S2 | 2 | 60 | 48 | 4 800 | 12 200 | 1.6 |
|  |  |  | 360 | 98 | 9 810 | 14 900 | 1.68 |
| SSATP 4 | S2bis | 1 | 30 | 29 | 2 900 | 12 300 | 1.65 |
|  |  |  | 300 | 76 | 7 610 | 18 200 | 1.64 |
| SSATP 5 | S3 | 2 | 30 | 35 | 3 500 | 12 800 | 1.68 |
|  |  |  | 250 | 86 | 8 610 | 15 500 | 1.71 |

TABLE-continued

Silica Supported Atom Transfer Polymerisations of MMA in toluene

| Type[a] | Support[b] | [lig]/[Cu] | Time (min) | Conv. (%) | $Mn_{th}$[d] (g/mol) | $Mn_{(SEC)}$ (g/mol) | PDI |
|---|---|---|---|---|---|---|---|
| SSATP 6 | S4 | 2 | 30 | 36 | 3 600 | 12 800 | 1.68 |
| | | | 260 | 91 | 9 110 | 16 350 | 1.78 |
| SSATP 7 | S5 | 2 | 30 | 30 | 3 000 | 18 900 | 2.1 |
| | | | 300 | 91 | 9 110 | 16 500 | 2.1 |
| SSATP 8 | S6 | ? | 60 | 40 | 4 000 | 50 850 | 2.5 |
| | | | 240 | 74 | 7 410 | 50 800 | 2.4 |

[a]further data are available
[b]See table V-7.
[c]3-aminopropyl silica gel; here [lig] is equal to the concentration of amine functions on the silica support.
[d]$Mn_{(th)} = ([M_{MMA}]_0/[I]_0 \times MW_{MMA}) \times$ conversion, where $MW_{MMA}$ is the molecular weight of methyl methacrylate and $[M_{MMA}]_0/[I]_0$ is the initial concentration ratio of MMA to initiator.

Figure 3:
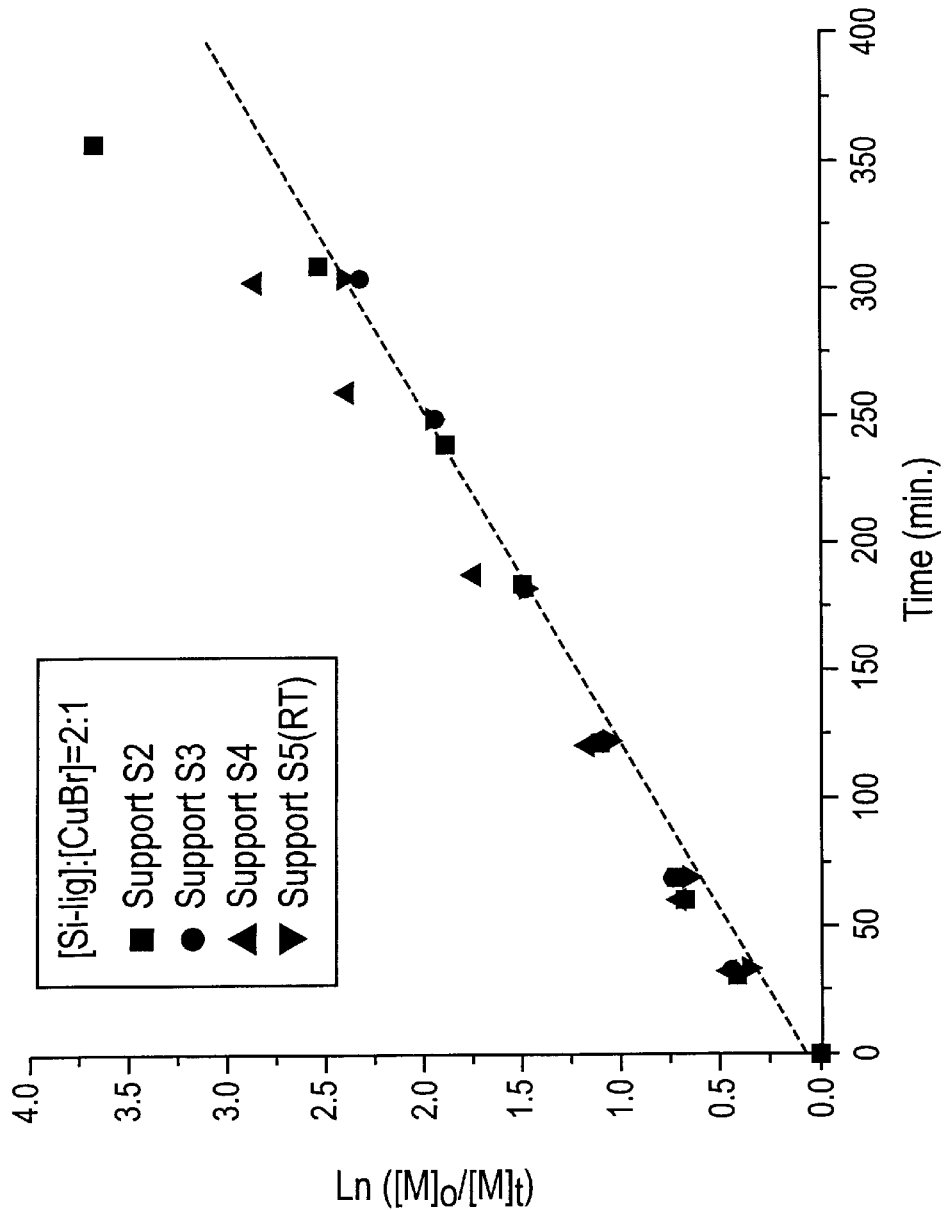
FIG. 3 shows kinetic reproducibility of silica supported atom transfer polymerisation from experiments carried out with different silica supported ligands synthesised at different times.

FIG. 3 shows kinetic reproducibility of silica supported atom transfer polymerisation from experiments carried out with different silica supported ligands synthesised at different times.

Recycling Experiments

Recycling experiments, using the same support, have also been carried out. Here, we present the results obtained when support S4 was used (some recycling experiments with support S2 are also available in §VI.3.2). A first polymerisation was carried out using 3 equivalents of silica supported ligand in reference to copper [MMA]:[Cu]:[Si-lig S4]:[E2BI]-100:1:3:1), then the solution medium was removed from the schlenk tube with a syringe. The support, still carrying the transition metal catalyst, was washed three times with degassed toluene introduced and removed from the tube by syringe. The support was then dried under vacuum. During all this procedure, the support stayed in the schlenk tube and was kept under nitrogen in order to avoid any deactivation by contact with air. The washed support was then reused for a new polymerisation by introducing into the schlenk tube, in the following order: 20 ml of toluene, 10 ml of MMA and 0.137 ml of E2BI (same condition as before: [MMA]:[Cu]:[Si-lig]:[E2BI]= 100:1:3:1). Three recycling polymerisations were experimented with the same support.

Figure 4:
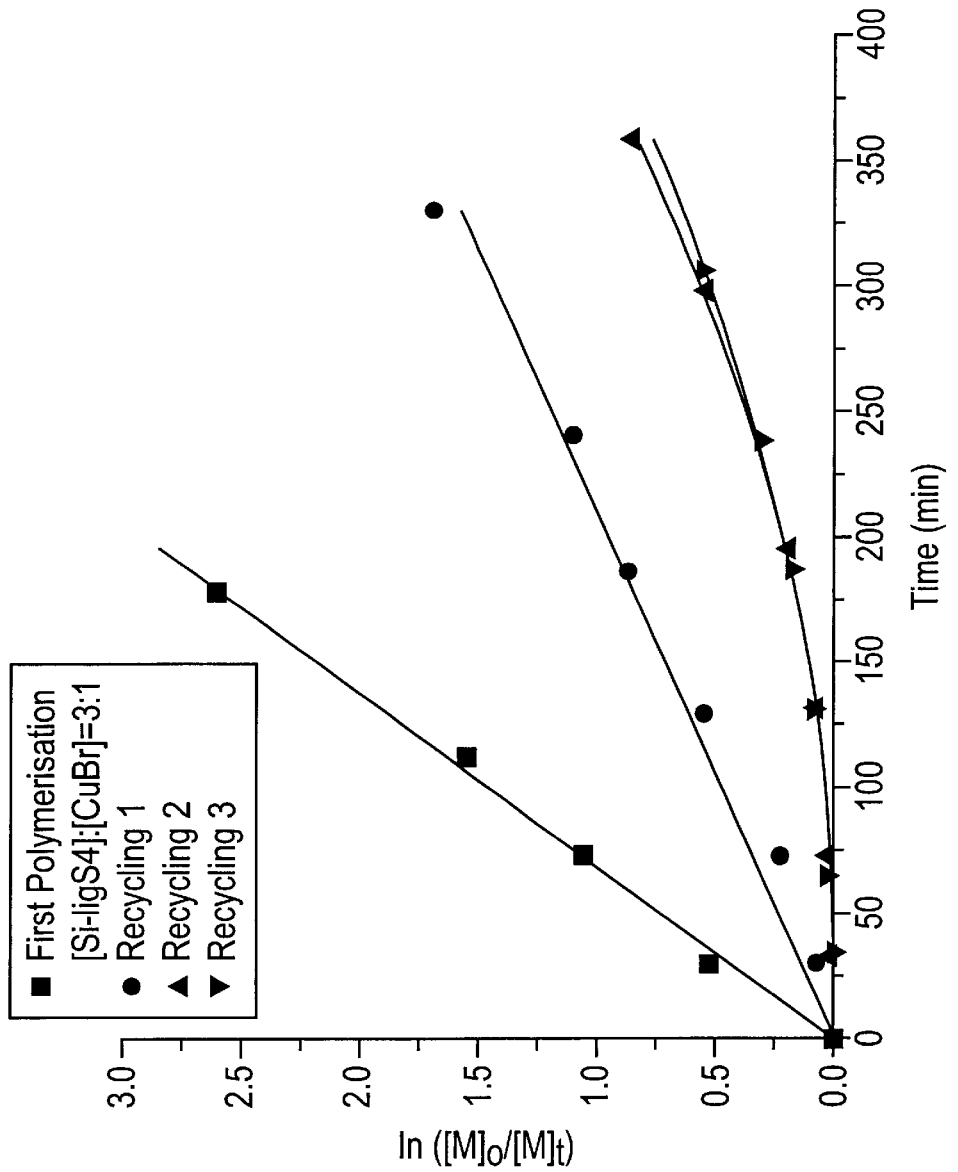
FIG. 4 shows recycling experiments carried out with support S4 using the same conditions.

FIG. 4 shows recycling experiments carried out with support S4 using the same conditions; [MMA]:[Cu]:[Si-lig]:[E2BI]=100:1:3:1

Each recycling experiment shows a decrease of the kinetic rate of polymerisation for MMA. However, recyclings 2 and 3 have the same kinetic behaviour. It seems that the catalyst activity is affected after each polymerisation. Probably, the amount of active species is reduced during the time of the experiment and the time of the washing of the support. This degradation finds a limit after a certain time or a certain number of recyclings. The polydispersities still remain the same (around 1.7), even after several use of the support.

TABLE

Recycling experiments carried out with support S4 for the polymerisation of MMA by silica supported atom transfer polymerisation; [MMA]:[Cu]:[Si-lig]:[E2BI] 100:1:3:1

| Experiment[a] | Time (min) | Conversion (%) | Mnth (g/mol) | Mn(SEC) (g/mol) | PDI |
|---|---|---|---|---|---|
| First polym. | 30 | 41 | 4100 | 11600 | 1.76 |
| | 180 | 90 | 9010 | 13800 | 1.8 |
| Recycling 1 | 130 | 43 | 4300 | 1900 | 1.75 |
| | 330 | 81 | 8110 | 16850 | 1.69 |
| Recycling 2 | 130 | 8 | 800 | | |
| | 360 | 57 | 5700 | 17100 | 1.69 |
| Recycling 3 | 130 | 8 | 800 | ? | ? |
| | 310 | 43 | 4300 | 17200 | 1.7 |

Influence of initiator and solvent on silica supported atom transfer polymerisation of MMA

TABLE

Influence of initiator and solvent on silica supported atom transfer polymerisation of MMA

| Support | [lig]/[Cu] | Initiator[b] | Solvent | Conv. % (6 h) | $Mn_{th}$[c] (g/mol) | $Mn_{(SEC)}$ (g/mol) | PDI |
|---|---|---|---|---|---|---|---|
| S1 | 1 | E2BI | Toluene | 67 | 6 500 | 18 500 | 1.79 |
| S1 | 1 | DPB | Toluene | 25 | 2 500 | 8 300 | 1.74 |
| S1 | 1 | TS | Toluene | 38 | 3 800 | 9 200 | 1.74 |
| S1 | 1 | E2BI | Anisole | 60 | 6 000 | 14 250 | 1.68 |
| S1 | 1 | E2BI | $Phe_2O$ | 84 | 8 410 | 17 580 | 1.71 |

[b]E2BI: ethyl-2-bromoisobutyrate; DPB: 1,1,1-diphenyl methyl bromide; TS: tosyl bromide
[c]$Mn_{(th)} = ([M_{MMA}]_0/[I]_0 \times$ conversion, where $MW_{MMA}$ is the molecular weight of methyl methacrylate and $[M_{MMA}]_0/[I]_0$ is the initial concentration ratio of MMA to initiator.

Ruthenium Supported Atom Transfer Polymerisation

Typical Polymerisation Procedure

In a typical reaction, for example [In]:[Ru]:[SiNH2]= 1:1:2, the ruthenium RuCl2(PPh3)3 (~0.45 g, 4.69×10$^{-4}$ mol) and the support (~0.90 g, 9.49×10$^{-4}$) are introduced in a schlenk tube and subjected to three vacuum/nitrogen cycles. Deoxygenated toluene (15 ml, 75% v/v) and deoxygenated methyl methacrylate (5 ml, 4.67×10$^{-2}$ mol) were added and the suspension stirred. The flask was heated in a thermostatted oil bath at 90° C. and when the temperature had equilibrated ethyl-2-bromoisobutyrate (0.069 mL, 4.69× 10$^{-4}$ mol, [MMA]0:[In]0=100:1) was added. Samples (1–2 ml) were taken approximately 15, 30, 60, 120, 180, 240 and 300 minutes after initiator was added. Conversions were calculated by gravimetry heating sample to constant weight overnight at 90° C. under vacuum. The polymer was then diluted in THF and passed through basic aluminum oxide in order to remote the ruthenium catalyst which has gone into solution.

TABLE

Molar ratios of components used in Silica supported-Ruthenium mediated-ATP

| Experiment | [MMA] | [E2BI] | [RUCl₂(PPh₃)₃] | [support]ᵃ |
|---|---|---|---|---|
| 1 | 100 | 2 | 1 | 4 |
| 2 | 100 | 1 | 1 | 4 |
| 3 | 100 | 0.5 | 1 | 4 |
| 4 | 100 | 1 | 2 | 8 |
| 5 | 100 | 1 | 0.5 | 2 |
| 6 | 100 | 1 | 1 | 8 |
| 7 | 100 | 1 | 1 | 2 |
| 8 | 100 | 1 | 0.5 | silicaᵇ |
| 9 | 100 | 1 | 0.5 | Al₂O₃ᶜ |
| 10ᵈ | 100 | 2 | 1 | 4 |

ᵃconcentration of NH₂ on 3-aminopropyl functionalised silica gel
ᵇsilica gel
ᶜbasic alumina
ᵈreused the catalyst from experiment 1

TABLE

Results for silica supported-ruthenium medicated-ATP (SS-Ru-ATP)

| Experiment | t(min) | Conversion (%) | Mnth (g/mol) | Mn (g/mol) | PDI |
|---|---|---|---|---|---|
| 1 | 30 | 34 | 1700 | 5040 | 1.82 |
|   | 180 | 90 | 4550 | 6780 | 1.56 |
| 2 | 30 | 40 | 4000 | 6750 | 1.76 |
|   | 180 | 93 | 9260 | 10700 | 1.5 |
| 3 | 30 | 35 | 7040 | 10300 | 1.74 |
|   | 240 | 91 | 18200 | 21500 | 1.49 |
| 4 | 30 | 46 | 4600 | 6530 | 1.56 |
|   | 180 | 98 | 9810 | 11250 | 1.54 |
| 5 | 30 | 23 | 2330 | 6420 | 1.97 |
|   | 180 | 78 | 7770 | 10500 | 1.55 |
| 6 | 30 | 39 | 3900 | 8000 | 3.1 |
|   | 120 | 88 | 8850 | 11300 | 2.22 |
| 7 | 30 | 26 | 2600 | 5280 | 1.50 |
|   | 180 | 75 | 7510 | 8380 | 1.47 |
| 8 | 45 | 18 | 1800 | 5780 | 1.51 |
|   | 240 | 42 | 4220 | 7850 | 1.67 |
| 9 | 45 | 22 | 2200 | 5850 | 1.59 |
|   | 180 | 40 | 4000 | 7240 | 1.57 |
| 10 | 30 | 25 | 1250 | 4930 | 2.14 |
|    | 240 | 88 | 4400 | 6770 | 1.73 |

Reinitiation Experiments

In order to confirm the living character of this polymerisation, reinitiations from previously synthesised PMMA (made by silica supported-ruthenium mediated-ATP: SS-Ru-ATP) have been carried out. Two types of macroinitiators PMMA1 and PMMA2 have been synthesised following the conditions from experiments 4 and 7 respectively. They have been used for initiation of MMA and BzMA by SS-Ru-ATP, keeping the same catalyst and support quantities.

TABLE molar ratios of components used in silica supported-ruthenium mediated-ATP reinitiation experiments

| Experiment | Macroinitiatorᵃ ([m]) | Monomer 2 ([M]) | [RUCl(PPh3)3] | [support]ᵇ |
|---|---|---|---|---|
| 11 | PMMA1 (0.317) | MMA (100) | 2 | 8 |
| 12 | PMMA1 (0.317) | BzMA (63) | 2 | 8 |
| 13 | PMMA2 (0.338) | MMA (100) | 1 | 2 |
| 14 | PMMA2 (0.338) | BzMA (63) | 1 | 2 |

ᵃPMMA1 synthesised following conditions [E2BI]:[Ru]:[NH2]= 1:2:8, experiment 4
PMMA2 synthesised following conditions [E2BI]:[Ru]:[NH2]= 1:1:2, experiment 7
ᵇconcentration of NH2 on 3-aminopropyl functionalised silica gel

TABLE

Data for SS-Ru-ATP macroinitiation experiments using different monomers

| Experiment | Macr targeted | Time (min) | Conv % 2ⁿᵈ pol° | Mnth (g/mol) | Mnexp (g/mol) | PDI |
|---|---|---|---|---|---|---|
| 11 | 41600 | 0 | 0 |  | 10083 | 1.37 |
|    |       | 30 | 30 | 20162 | 15230 | 1.57 |
|    |       | 285 | 85 | 36736 | 31013 | 2.62 |
| 12 | 45040 | 0 | 0 |  | 10083 | 1.37 |
|    |       | 30 | 60 | 30548 | 23262 | 1.60 |
|    |       | 180 | 95 | 43297 | 37105 | 1.88 |
| 13 | 39080 | 0 | 0 |  | 9465 | 1.26 |
|    |       | 30 | 30 | 18079 | 14282 | 1.37 |
|    |       | 330 | 95 | 37147 | 29369 | 1.48 |
| 14 | 42280 | 0 | 0 |  | 9465 | 1.26 |
|    |       | 30 | 55 | 27113 | 18132 | 1.35 |
|    |       | 200 | 90 | 39535 | 26969 | 1.35 |

Polystyrene Supported Atom Transfer Polymerisation

Typical Polymerisation Procedure

In a typical PS-SATP reaction, CuBr (0.134 g, 9.34×10⁻⁴ mol) and the support (x grams, depending on the experimentally calculated loading of ligand onto the support; [PS-lig]:[Cu]=n:1, where [PS-lig] is the concentration of ligand anchored to the polystyrene support and n=1, 2, 3, 4, etc. . . . ) were placed in a predried Schlenk flask which was evacuated and then flushed with nitrogen three times. Decoxygenated toluene (20 ml, 66% v/v) and deoxygenated methyl methacrylate (10 mL, 9.36×10⁻² mol) were added and the suspension stirred. The flask was heated in a thermostatted oil bath at 90° C. and when the temperature had equilibrated ethyl-2-bromoisobutyrate (0.137 mL, 9.34× 10⁻⁴ mol, [MMA]0:[In]0=100:1) was added. Samples (1–2 ml) were taken periodically after initiator was added. Conversions were calculated by gravimetry heating sample to constant weight overnight at 90° C. under vacuum. The polymer was then diluted in THF and passed through basic aluminum oxide in order to remove the copper catalyst which has gone into solution.

TABLE

Polystyrene Supported Atom Transfer Polymerisation of MMA in toluene

| Type | Support | [lig]/[Cu][b] | Time (min) | Conv. (%) | Mnth[c] (g/mol) | Mn(SEC) (g/mol) | PDI |
|---|---|---|---|---|---|---|---|
| ATP | / | 2 | 60 | 15 | 1 500 | 3 430 | 1.14 |
|   |   |   | 360 | 80 | 8 010 | 9 050 | 1.11 |
| PS-SATP | PS2 | 1.25 | 33 | 29.6 | 2 960 | 14 020 | 1.55 |
|   |   |   | 83 | 47.2 | 4 720 | 14 760 | 1.62 |
|   |   |   | 120 | 55.6 | 5 560 | 16 510 | 1.51 |
|   |   |   | 185 | 66.3 | 6 630 | 16 520 | 1.56 |
|   |   |   | 245 | 72.2 | 7 230 | 15 500 | 1.66 |
|   |   |   | 300 | 77.5 | 7 760 | 15 590 | 1.66 |
|   |   |   | 363 | 83.6 | 8 370 | 16 230 | 1.62 |
| PS-SATP | PS4 | 2 | 35 | 25.6 | 2 600 | 8 125 | 1.47 |
|   |   |   | 310 | 84 | 8 400 | 11 150 | 1.63 |
| PS-SATP | PS6 | 1.25 | 30 | 25.1 | 2 510 | 7 530 | 1.45 |
|   |   |   | 61 | 36.7 | 3 670 | 8 670 | 1.54 |
|   |   |   | 120 | 49.4 | 4 940 | 10 215 | 1.51 |
|   |   |   | 180 | 60.1 | 6 010 | 11 140 | 1.53 |
|   |   |   | 240 | 68.6 | 6 860 | 11 740 | 1.51 |
|   |   |   | 300 | 75.2 | 7 530 | 11 670 | 1.56 |
| PS-SATP | PS6 bis | 1.25 | 32 | 25.1 | 2 510 | 6 950 | 1.41 |
|   |   |   | 60 | 35.5 | 3 550 | 8 170 | 1.41 |
|   |   |   | 147 | 55.1 | 5 510 | 9 880 | 1.41 |
|   |   |   | 196 | 62.6 | 6 260 | 10 590 | 1.41 |
|   |   |   | 240 | 67.5 | 6 750 | 10 710 | 1.43 |
|   |   |   | 300 | 73.5 | 7 360 | 11 370 | 1.42 |
| PS-SATP | PS7 | 1 | 31 | 20.9 | 2 100 | 8 320 | 1.42 |
|   |   |   | 300 | 53.3 | 5 300 | 12 050 | 1.45 |
| PS-SATP | PS7 | 2 | 31 | 28.5 | 2 800 | 7 580 | 1.39 |
|   |   |   | 300 | 70 | 7 010 | 11 890 | 1.39 |

[b]Here [lig] is equal to the concentration of ligand functions on the polystyrene support.
[c]Mn(th) = ([MMMA]0/[I]0 × MWMMA) × conversion, where MWMMA is the molecular weight of methyl methacrylate and [MMMA]0/[I]0 is the initial concentration ratio of MMA to initiator.

Effect of the Amount of Polystyrene Supported Ligand

TABLE

Effect of the amount of polystyrene support on polystyrene supported atom transfer polymerisations of MMA in toluene

| Support | [lig]/[Cu][b] | Time (min) | Conv. (%) | Mnth[c] (g/mol) | Mn[SEC] (g/mol) | PDI |
|---|---|---|---|---|---|---|
| PS7 | 1 | 31 | 20.9 | 2090 | 8320 | 1.42 |
|   |   | 60 | 28.0 | 2800 | 8790 | 1.48 |
|   |   | 123 | 38.5 | 3850 | 10510 | 1.44 |
|   |   | 186 | 45.2 | 4520 | 11190 | 1.45 |
|   |   | 253 | 50.4 | 5040 | 12550 | 1.39 |
|   |   | 300 | 53.3 | 5330 | 12050 | 1.45 |
| PS7 | 2 | 31 | 28.5 | 2850 | 7580 | 1.39 |
|   |   | 60 | 35.7 | 3570 | 8110 | 1.43 |
|   |   | 123 | 50.8 | 5080 | 9970 | 1.39 |
|   |   | 186 | 59.8 | 5980 | 11130 | 1.36 |
|   |   | 251 | 63.4 | 6340 | 11070 | 1.4 |
|   |   | 300 | 70.0 | 7010 | 11390 | 1.39 |
| PS7 | 3 | 31 | 34.9 | 3490 | 7870 | 1.43 |
|   |   | 60 | 45.5 | 4550 | 9630 | 1.42 |
|   |   | 123 | 60.9 | 6090 | 11390 | 1.44 |
|   |   | 186 | 69.5 | 6950 | 12140 | 1.48 |
|   |   | 252 | 78.9 | 7900 | 12940 | 1.48 |
|   |   | 300 | 82.7 | 8280 | 13450 | 1.48 |
| PS7 | 4 | 31 | 37.8 | 3780 | 85900 | 1.55 |
|   |   | 60 | 51.0 | 5100 | 9700 | 1.63 |
|   |   | 123 | 69.7 | 6970 | 11120 | 1.68 |
|   |   | 186 | 81.1 | 8120 | 12230 | 1.66 |
|   |   | 252 | 87.2 | 8730 | 13510 | 1.59 |
|   |   | 300 | 89.2 | 8930 | 13650 | 1.59 |

[b]Here [lig] is equal to the concentration of ligand functions on the polystyrene support.
[c]Mn(th) = ([MMMA]0/[I]0 × MWMMA) × conversion, where MWMMA is the molecular weight of methyl methacrylate and [MMMA]0/[I]0 is the initial concentration ratio of MMA to initiator.

The (di)Amine Route

TABLE

Experimental data for the PS-SATP of MMA mediated by copper catalyst complexed by different supports synthesised following the (di)amine route

| Support | name | [Lig]0/[Cu]0 | time (min) | Conv. (%) | Mn (th)[b] | Mn (SEC) | PDI (SEC) |
|---|---|---|---|---|---|---|---|
| E | PS-EDA-lig | ~3 | 29 | 34.0 | 3 400 | 7 020 | 2.43 |
|   |   |   | 241 | 96.0 | 9 610 | 13 900 | 2.09 |
| G | PS-TAEA-lig | 2.9 | 36 | 36.6 | 3 660 | 12 375 | 2.06 |
|   |   |   | 312 | 95.2 | 9 530 | 15 890 | 1.95 |
| H | PS-HEMDA-lig | 2 | 30 | 25.8 | 2 580 | 16 050 | 1.78 |
|   |   |   | 180 | 74.7 | 7 480 | 16 250 | 1.77 |
|   |   |   | 292 | 93.5 | 9 360 | 16 150 | 1.8 |
| F1 | PS-DETA-lig | ~5 | 36 | 44.1 | 4 410 | 10 440 | 2.61 |
|   |   |   | 67 | 62.3 | 6 230 | 11 570 | 2.31 |
|   |   |   | 131 | 83.1 | 8 320 | 12 950 | 2.15 |
|   |   |   | 188 | 92.7 | 9 280 | 14 120 | 2.08 |
|   |   |   | 250 | 99.1 | 9 920 | 17 110 | 1.79 |
| F2 | PS-DETA-lig | ~5 | 29 | 38.6 | 3 860 | 9 200 | 2.02 |
|   |   |   | 62 | 62.0 | 6 200 | 11 080 | 1.92 |
|   |   |   | 126 | 82.2 | 8 230 | 13 250 | 1.86 |
|   |   |   | 181 | 90.9 | 9 100 | 14 340 | 1.86 |
|   |   |   | 241 | 96.6 | 9 670 | 14 640 | 1.89 |

[b]Mn(th) = ([MMMA]0/[I]0 × MWMMA) × conversion, where MWMMA is the molecular weight of methyl methacrylate and [MMMA]0/[I]0 is the initial concentration ratio of MMA to initiator.

The Amino-hexanol Route

TABLE

Experimental data for the PS-SATP of MMA mediated by copper catalyst complexed by different supports synthesized following the amino-hexanol route

| Support | name | [Lig]0/[Cu]0 | time (min) | Conv. (%) | Mn(th)[b] | Mn (SEC) | PDI (SEC) |
|---------|------|--------------|------------|-----------|-----------|----------|-----------|
| PS7 | PS-lig | 2 | 31 | 28.5 | 2 850 | 7 580 | 1.39 |
|  |  |  | 60 | 35.7 | 3 570 | 8 110 | 1.43 |
|  |  |  | 123 | 50.8 | 5 080 | 9 970 | 1.39 |
|  |  |  | 186 | 59.8 | 5 980 | 11 130 | 1.36 |
|  |  |  | 251 | 63.4 | 6 340 | 11 070 | 1.4 |
|  |  |  | 300 | 70.0 | 7 010 | 11 890 | 1.39 |
| K1 | PS-AHO-lig | 2 | 30 | 27.1 | 2 710 | 13 880 | 1.81 |
|  |  |  | 64 | 42.4 | 4 240 | 14 540 | 1.78 |
|  |  |  | 119 | 58.9 | 5 890 | 15 670 | 1.75 |
|  |  |  | 180 | 70.6 | 7 070 | 15 870 | 1.76 |
|  |  |  | 244 | 79.8 | 7 990 | 18 040 | 1.6 |
|  |  |  | 292 | 85.6 | 8 570 | 18 250 | 1.63 |
| K2 | PS-AHO-lig | 2 | 30 | 26.8 | 2 680 | 10 370 | 1.6 |
|  |  |  | 64 | 44.0 | 4 400 | 12 660 | 1.53 |
|  |  |  | 119 | 61.0 | 6 100 | 14 730 | 1.53 |
|  |  |  | 180 | 72.9 | 7 300 | 16 230 | 1.48 |
|  |  |  | 244 | 82.5 | 8 260 | 16 660 | 1.51 |
|  |  |  | 292 | 87.4 | 8 750 | 18 080 | 1.46 |
| L | PS-AHO-lig | 2 | 30 | 12.9 | 1 290 | 26 130 | 1.8 |
|  |  |  | 64 | 19.1 | 1 910 | 26 950 | 1.81 |
|  |  |  | 119 | 27.3 | 2 730 | 29 210 | 1.79 |
|  |  |  | 180 | 33.9 | 3 390 | 29 390 | 1.83 |
|  |  |  | 244 | 38.1 | 3 810 | 30 750 | 1.78 |
|  |  |  | 292 | 42.9 | 4 290 | 29 920 | 1.84 |

[b]Mn(th) = ([MMMA]0/[I]0 × MWMMA) × conversion, where MWMMA is the molecular weight of methyl methacrylate and [MMMA]0/[I]0 is the initial concentration ratio of MMA to initiator.

Reinitiation Experiments

In a typical reinitiation experiment, CuBr (0.134 g, 9.34×$10^{-4}$ mol) and the macroinitiator (x grams, depending on the experimental molecular weight obtained from SEC and assuming that PDI=1, [macroinitiator]:[Cu]=0.182:1) were placed in a predried Schlenk flask which was evacuated and then flushed with nitrogen three times. Deoxygenated toluene (30 ml, 75% v/v) and deoxygenated methyl methacrylate (10 mL, 9.36×$10^{-2}$ mol, [MMA]0:[Cu]0=900:1) or deoxygenated benzyl methacrylate (10 ml, 5.92×$10^{-2}$ mol, [BzMA]0:[Cu]0=63.22:1) were added and the suspension stirred until all the macroinitiator is dissolved. The flask is then submitted to three Freeze-Pump-Thaw cycles (FPT). When the temperature had equilibrated to room temperature, N-$^n$pentyl-2-pyridine methanimine ligand (1) (0.36 ml, 1.87×$10^{-3}$ mol [Lig]0:[Cu]0=2:1) is added by syringe and the flask is heated straightforward in a thermostatted oil bath at 90° C. Samples (1–2 ml) were taken periodically using syringes after the start of the heating. Conversions were calculated by gravimetry heating sample to constant weight overnight at 90° C. under vacuum. The polymer was then diluted in THF and passed through basic aluminum oxide in order to remove the copper catalyst which has gone into solution.

TABLE molar ratios of components used in reinitiation experiments***

| Experiment | Macro-initiator[a] | [In] | Monomer 2 [MMA] | pentyl ligand [Lig] | [CuBr] |
|------------|--------------------|------|-----------------|---------------------|--------|
| 1 | PMMA(A) | 0.182 | 100 | 2 | 1 |
| 2 | PMMA(S) | 0.182 | 100 | 2 | 1 |
| 3 | PMMA(P) | 0.182 | 100 | 2 | 1 |
| 4 | PMMA(L) | 0.182 | 100 | 2 | 1 |

[a]PMMA (A) synthesised following conditions [MMA]:[CuBr]:[lig]:[E2BI] = 100:1:2:1
PMMA (S) synthesised following conditions [MMA]:[CuBr]:[Si-lig S4]:[E2BI] = 100:1:1:1
PMMA (P) synthesised following conditions [MMA]:[CuBr]:[PS-lig PS6]:[E2BI] = 100:1:1:1

PMMA (L) synthesised following conditions [MMA]:[CuBr]:[Si-lig S4]:[E2BI]=100:1:2:1
These results are shown in FIG. 5.

TABLE

Data for macrointiation experiments using different monomers

| Experiment | Macro-init. | Time (min) | Conv % 2$^{nd}$ pol ° | Mnth (g/mol) | Mnexp | PDI |
|------------|-------------|------------|-----------------------|--------------|-------|-----|
| 1 | PMMA (A) | 0 | 0 |  | 7616 | 1.19 |
|  |  | 34 | 10.5 | 13374 | 12546 | 1.17 |
|  |  | 63 | 15.1 | 15898 | 14760 | 1.21 |
|  |  | 130 | 22.1 | 19749 | 19230 | 1.25 |
|  | 61%-3 h | 186 | 26.9 | 22419 | 22270 | 1.3 |
|  |  | 244 | 30.6 | 24419 | 25210 | 1.31 |
|  |  | 278 | 32.5 | 25507 | 27570 | 1.29 |
| 2 | PMMA (S) | 0 | 0 |  | 16575 | 1.46 |
|  |  | 33 | 10.4 | 22293 | 17130 | 1.28 |
|  |  | 62 | 15.1 | 24873 | 22510 | 1.39 |
|  |  | 129 | 22.2 | 28761 | 29540 | 1.25 |

TABLE-continued

Data for macrointiation experiments using different monomers

| Experiment | Macro-init. | Time (min) | Conv % 2nd pol ° | Mnth (g/mol) | Mnexp | PDI |
|---|---|---|---|---|---|---|
|  | 2 h | 185 | 26.7 | 31244 | 31330 | 1.27 |
|  |  | 241 | 30.5 | 33366 | 34640 | 1.25 |
|  |  | 278 | 32.7 | 34534 | 35810 | 1.25 |
| 3 | PMMA (P) | 0 | 0 |  | 13105 | 1.5 |
|  |  | 33 | 12.1 | 19773 | 18770 | 1.17 |
|  |  | 62 | 17.1 | 22493 | 20510 | 1.19 |
|  |  | 129 | 23.2 | 25853 | 23940 | 1.20 |
|  |  | 185 | 28.2 | 28608 | 26300 | 1.20 |
|  |  | 241 | 31.8 | 30617 | 28440 | 1.21 |
|  |  | 278 | 32.8 | 31143 | 29150 | 1.22 |
| 4 | PMMA (L) | 0 | 0 |  | 6896 | 1.46 |
|  |  | 33 | 10.9 | 12862 | 12250 | 1.19 |
|  |  | 62 | 15.7 | 15508 | 14340 | 1.19 |
|  |  | 129 | 23.2 | 19704 | 18250 | 1.18 |
|  |  | 185 | 27.3 | 21901 | 20480 | 1.19 |
|  | 69% 2h | 241 | 30.8 | 23812 | 16130 | 1.19 |
|  |  | 278 | 33.3 | 25198 | 24320 | 1.19 |

Block Copolymerisation

TABLE

Molar ratios of components used in reinitiation experiments

| Experiment | Macro-initiator<sup>a</sup> | [In] | Monomer 2 [MMA] | pentyl ligand [Lig] | [CuBr] |
|---|---|---|---|---|---|
| 5 | PMMA (A) | 0.182 | 63.22 | 2 | 1 |
| 6 | PMMA (S) | 0.182 | 63.22 | 2 | 1 |
| 7 | PMMA (P) | 0.182 | 63.22 | 2 | 1 |
| 8 | PMMA (L) | 0.182 | 63.22 | 2 | 1 |

<sup>a</sup>PMMA (A) synthesised following conditions [MMA]:[CuBr]:[lig]:[E2BI] = 100:1:2:1
PMMA (S) synthesised following conditions [MMA]:[CuBr]:[Si-lig S4]: [E2BI] = 100:1:1:1
PMMA (P) synthesised following conditions [MMA]:[CuBr]:[PS-lig PS6]: [E2BI] = 100:1:1:1
PMMA (L) synthesised following conditions [MMA]:[CuBr]:[Si-lig S4]: [E2BI] = 100:1:2:1

TABLE

Data for macrointiation experiments using different monomers

| Experiment | Macro-init. | Time (min) | Conv % 2nd pol ° | Mnth (g/mol) | Mnexp | PDI |
|---|---|---|---|---|---|---|
| 1 | PMMA (A) | 0 | 0 |  | 7616 | 1.19 |
|  |  | 38 | 18.4 | 18890 | 17536 | 1.59 |
|  |  | 64 | 23.0 | 21670 | 19861 | 1.28 |
|  |  | 131 | 34.6 | 28790 | 26391 | 1.34 |
|  | 61%-3 h | 261 | 73.0 | 52308 | 51028 | 1.83 |
|  |  | 309 | 79.6 | 56348 | 45112 | 1.99 |
|  |  | 358 | 80.2 | 56680 | 42580 | 2.00 |
| 6 | PMMA (S) | 0 | 0 |  | 21828 | 1.47 |
|  | 2 | 33 | 19.9 | 33985 | 29395 | 1.75 |
|  |  | 59 | 22.6 | 35647 | 30172 | 1.62 |
|  |  | 126 | 35.4 | 43482 | 35658 | 1.58 |
|  | 3 h 62% | 256 | 59.6 | 58283 | 45600 | 1.83 |
|  |  | 304 | 71.1 | 65325 | 54698 | 1.80 |
|  |  | 353 | 75.8 | 68207 | 55380 | 1.79 |
| 7 | PMMA (P) | 0 | 0 |  | 14676 | 1.23 |
|  |  | 35 | 19.6 | 26689 | 24023 | 1.42 |
|  | 3 h | 66 | 29.1 | 32497 | 28194 | 1.51 |
|  | 52% | 127 | 42.7 | 40790 | 35295 | 1.73 |
|  |  | 257 | 63.3 | 53397 | 44560 | 1.71 |
|  |  | 305 | 77.7 | 62208 | 53841 | 1.63 |
|  |  | 354 | 83.8 | 65984 | 43105 | 1.81 |

TABLE-continued

Data for macrointiation experiments using different monomers

| Experiment | Macro-init. | Time (min) | Conv % 2nd pol ° | Mnth (g/mol) | Mnexp | PDI |
|---|---|---|---|---|---|---|
| 8 | PMMA (L) | 0 | 0 |  | 6896 | 1.46 |
|  |  | 36 | 16.7 | 17097 |  |  |
|  |  | 61 | 22.5 | 20673 |  |  |
|  |  | 128 | 37.0 | 29552 |  |  |
|  |  | 258 | 49.1 | 36922 |  |  |
|  | 69% 2 h | 306 | 52.2 | 38444 |  |  |
|  |  | 355 | 60.7 | 44070 | 28240 | 1.83 |

Recyclability

TABLE

Recycling experiments carried out with support PS7 for the polymerisation of MMA by polystyrene supported atom transfer polymerisation; [MMA]:[Cu]:[PS-lig PS7]:[E2BI] = 100:1:2:1

| Experiment | Time (min) | Conversion (%) | Mnth (g/mol) | Mn(SEC) (g/mol) | PDI |
|---|---|---|---|---|---|
| First polym. | 31 | 28.5 | 2850 | 7580 | 1.39 |
|  | 60 | 35.7 | 3570 | 8110 | 1.43 |
|  | 123 | 50.8 | 5080 | –9970 | 1.39 |
|  | 136 | 59.8 | 5980 | 11130 | 1.36 |
|  | 231 | 63.4 | 6340 | 11070 | 1.4 |
|  | 300 | 70.0 | 7010 | 11890 | 1.39 |
| Recycling 1 | 29 | 4.06 | 400 |  |  |
|  | 69 | 7.04 | 700 |  |  |
|  | 134 | 15.4 | 1540 | 12000 | 1.68 |
|  | 172 | 22.5 | 2250 | 13810 | 1.61 |
|  | 255 | 38.1 | 3810 | 14760 | 1.65 |
|  | 329 | 52.1 | 5210 | 16560 | 1.61 |
|  | 365 | 58.5 | 5850 | 16880 | 1.59 |
| Recycling 2 | 76 | 1.90 | 190 |  |  |
|  | 125 | 4.45 | 445 |  |  |
|  | 176 | 8.00 | 801 |  |  |
|  | 265 | 17.1 | 1714 |  |  |
|  | 336 | 25.7 | 2575 |  |  |

What is claimed is:

1. A catalyst for the addition polymerization of olefinically unsaturated monomers comprising a supported ligand of General Formula 1:

$$S(D)_n \quad \text{Formula 1}$$

where:
S is the support,
D is a compound attached to the support, said compound being capable of complexing with a transition metal ion, and
n is an integer of one or more; in combination with
  a) a compound of:

$$MY \quad \text{Formula 30}$$

where:
M is a transition metal in a low valency state or a transition metal in a low valency state co-ordinated to at least one co-ordinating non-charged ligand, wherein the transition metal is selected from the group consisting of Cu(I), Fe(II), Co(II), Ru(II), Ni(II), Rh(I), and Ru(III), and
Y is a mono- or polyvalent counter ion; and
  b) an initiator compound comprising a homolytically cleavable bond with a halogen atom.

2. A catalyst for use in the polymerisation of olefinically unsaturated monomers, comprising a compound of general formula:

$$((SD)_c M)^{d+} A \qquad \text{Formula 52}$$

where:

M=a transition metal in a low valency state or a transition metal co-ordinated to at least one co-ordinating non-charged ligand, wherein the transition metal is selected from the group consisting of Cu(I), Fe(II), Co(II), Ru(II), Ni(II), Rh(I), and Ru(III), S=a support, D=a compound attached to the support, the compound being capable of complexing with a transition metal, d=an integer of 1 or 2, c=an integer of 1 or 2, and A=a monovalent or divalent counter ion and an initiator compound having a homolytically cleavable bond with a halogen atom.

3. A catalyst according to claim 2, wherein the co-ordinating ligand is $(CH_3CN)_4$.

4. A catalyst according to claim 1, wherein the initiator compound is selected from the group consisting of:

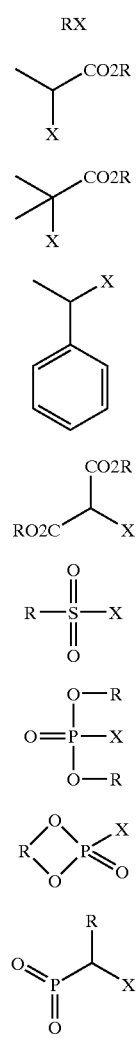

Formula 31
Formula 32
Formula 33
Formula 34
Formula 35
Formula 36
Formula 37
Formula 38
Formula 39

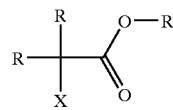

Formula 40

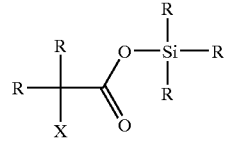

formula 41 where:

R is independently selectable and is selected from straight, branched or cyclic alkyl, hydrogen, substituted alkyl, hydroxyalkyl, carboxyalkyl or substituted benzyl, X is a halide.

5. A catalyst according to claim 1, wherein compound D is a diimine.

6. A catalyst according to claim 5, wherein one of the nitrogens of the diimine is not part of an aromatic ring.

7. A catalyst according to claim 5, wherein the diimine is selected from the group consisting of:

a 1,4-diaza-1,3-butadiene

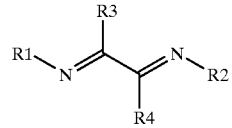

Formula 2 a 2-pyridinecarbaldehyde imine

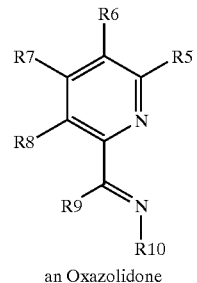

Formula 3 an Oxazolidone

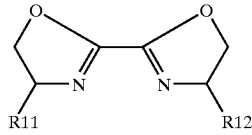

Formula 4 and a Quinoline Carbaldehyde

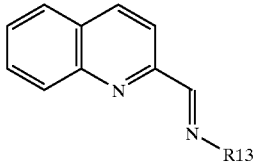

Formula 5 where $R_1$, $R_2$, $R_{10}$, $R_{11}$, $R_{12}$ and $R_{13}$ may be varied independently and $R_1$, $R_2$, $R_{10}$, $R_{11}$, $R_{12}$ and $R_{13}$ may be H, straight chain, branched chain or cyclic saturated alkyl, hydroxyalkyl, carboxyalkyl, aryl, $CH_2Ar$ (where Ar=aryl or substituted aryl) or a halogen; and $R_3$ to $R_9$ may independently be selected from the group described for $R_1$, $R_2$, $R_{10}$, $R_{11}$, $R_{12}$ and $R_{13}$ or additionally $OC_nH_{2n+1}$, (where n is an integer from 1 to 20), $NO_2$, CN or O=CR (where R=alkyl, benzyl $PhCH_2$ or a substituted benzyl).

8. The catalyst according to claim 5, wherein D exhibits a chiral centre α to one of the nitrogen groups.

9. The catalyst according to claim 7, wherein D is a compound of general Formula 3 which comprises one or more fused rings on the pyridine group.

10. The catalyst according to claim 7, wherein one or more adjacent $R_1$, and $R_3$, $R_3$ and $R_4$, $R_4$ and $R_2$, $R_{10}$ and $R_9$, $R_8$ and $R_9$, $R_8$ and $R_7$, $R_7$ and $R_6$, $R_6$ and $R_5$ groups are selected from the group consisting of $C_5$ to C8 cycloalkyl, cycloalkenyl, polycycloalkyl, polycycloalkenyl and cyclicaryl.

11. The catalyst according to claim 7, wherein the diimine compound is covalently attached to the support via positions R1, R2, R9, R10, R11, R12 or R13.

12. A process for the production of, a catalyst according to claim 5, comprising the steps of:
   a) providing a functionalised support;
   b) providing a ligand precursor, wherein one of the functionalised support or the ligand precursor comprises a primary amine, and the other of the functionalised support or the ligand precursor comprises an aldehyde or ketone group; and
   c) reacting the primary amine with the aldehyde or ketone to form a diimine compound covalently attached to the support.

13. Process according to claim 12, wherein the diimine compound produced is then mixed with a transition metal halide to produce a diimine co-ordinated to a transition metal.

14. Process according to claim 13, wherein the transition metal halide is CuCl or CuBr.

15. A process for the addition polymerisation of one or more olefinically unsaturated monomers comprising the use of a catalyst according to claim 1.

16. A process according to claim 15, wherein the olefinically unsaturated monomer is selected from a methacrylate, an acrylate, a styrene, a methacrylonitrile or a diene.

17. A process according to claim 14, wherein the catalyst is used at a temperature between −20° C. and 200° C.

18. A process according to claim 15, additionally comprising the use of a free-radical inhibitor.

19. A process according to claim 15, wherein the amount of D: MY is between 0.01 to 1000 and ratio of MY: initiator is 0:0001 to 1000.

20. The catalyst according to claim 4, wherein X is selected from the group consisting of I, Br, F and Cl.

21. The catalyst according to claim 7, wherein $R_1$, $R_2$, $R_{10}$, $R_{11}$, $R_{12}$, and $R_{13}$ is a phenyl, or substituted phenyl, wherein the substitution of the phenyl is as described for $R_3$ to $R_9$.

22. The catalyst according to claim 10, wherein the the $C_5$ to $C_8$ cycloalkyl, cycloalkenyl, polycycloalkyl, polycycloalkenyl or cyclic aryl group is a cyclohexyl, cyclohexenyl or norborneyl.

* * * * *